(12) United States Patent
Tzikas et al.

(10) Patent No.: US 7,572,301 B2
(45) Date of Patent: Aug. 11, 2009

(54) FIBRE-REACTIVE DYES, THEIR PREPARATION AND THEIR USE

(75) Inventors: Athanassios Tzikas, Pratteln (CH); Georg Roentgen, Freiburg (DE); Hubert Jean Luc Christnacher, Dietwiller (FR)

(73) Assignee: Huntsman International LLC, The Woodlands, TX (US)

( * ) Notice: Subject to any disclaimer, the term of this patent is extended or adjusted under 35 U.S.C. 154(b) by 393 days.

(21) Appl. No.: 10/592,976

(22) PCT Filed: Mar. 9, 2005

(86) PCT No.: PCT/EP2005/051044

§ 371 (c)(1),
(2), (4) Date: Sep. 15, 2006

(87) PCT Pub. No.: WO2005/090484

PCT Pub. Date: Sep. 29, 2005

(65) Prior Publication Data

US 2008/0250575 A1    Oct. 16, 2008

(30) Foreign Application Priority Data

Mar. 19, 2004  (EP) .................. 04101144

(51) Int. Cl.
C09B 67/00 (2006.01)
C09B 62/00 (2006.01)

(52) U.S. Cl. .......... 8/641; 8/667; 8/669; 8/670; 8/681; 8/688; 534/637

(58) Field of Classification Search .......... 8/641, 8/667, 669, 670, 681, 688; 534/637
See application file for complete search history.

(56) References Cited

U.S. PATENT DOCUMENTS

| | | | |
|---|---|---|---|
| 6,011,140 A | 1/2000 | Zamponi et al. | |
| 6,197,941 B1 | 3/2001 | Zamponi et al. | |
| 6,537,332 B1 * | 3/2003 | Tzikas et al. ........... | 8/549 |

FOREIGN PATENT DOCUMENTS

| | | |
|---|---|---|
| DE | 19640189 | 4/1998 |
| JP | 63199269 | 8/1988 |

OTHER PUBLICATIONS

STIC Search Report dated Dec. 1, 2008.*

* cited by examiner

Primary Examiner—Eisa B Elhilo

(57) ABSTRACT

Reactive dyes of formula

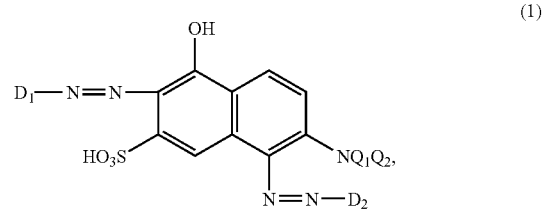

wherein
$Q_1$ and $Q_2$ are each independently of the other hydrogen or unsubstituted or substituted $C_1$-$C_4$alkyl,
$D_1$ is the radical of a diazo component, which is itself a mono- or dis-azo dye or contains such a dye,
$D_2$ has the same definition as $D_1$ or is a radical of formula

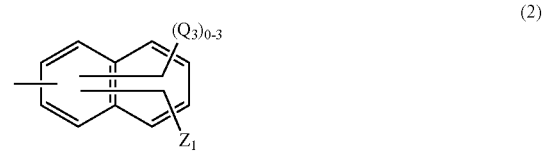

wherein
$(Q_3)_{0-3}$ denotes from 0 to 3 identical or different substituents selected from the group halogen, $C_1$-$C_4$alkyl, $C_1$-$C_4$alkoxy, carboxy and sulfo and
$Z_1$ is a radical of formula $$-SO_2-Y \quad (3a),$$
$$-NH-CO-(CH_2)_m-SO_2-Y \quad (3b),$$
$$-CONH-(CH_2)_n-SO_2-Y \quad (3c),$$
$$-NH-CO-CH(Hal)-CH_2-Hal \quad (3d) \text{ or}$$
$$-NH-CO-C(Hal)=CH_2 \quad (3e),$$

Y is vinyl or a —$CH_2$—$CH_2$—U radical and U is a group that is removable under alkaline conditions,
m and n are each independently of the other the number 2, 3 or 4, and
Hal is halogen,
are suitable for dyeing cellulosic or amide-group-containing fibre materials.

12 Claims, No Drawings

FIBRE-REACTIVE DYES, THEIR PREPARATION AND THEIR USE

The present invention relates to fibre-reactive dyes, to a process for their preparation and to their use in the dyeing or printing of textile fibre materials.

The practice of dyeing using reactive dyes has recently led to higher demands being made on the quality of the dyeings and the economic efficiency of the dyeing process. As a result, there continues to be a need for novel reactive dyes having improved properties, especially in respect of their application.

Dyeing nowadays requires reactive dyes that have sufficient substantivity and at the same time have good ease of washing off of unfixed dye. They should also have a good colour yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye bond stabilities, and in addition it should be possible for dye not fixed to the fibre to be washed off readily. The dyes should also yield dyeings having good allround fastness properties, for example fastness to light and to wetting.

It has been found that the problem posed is largely solved by the novel dyes defined herein-below.

The present invention therefore relates to reactive dyes of formula

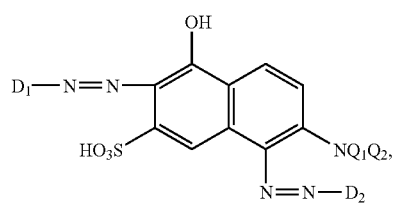

(1)

wherein $Q_1$ and $Q_2$ are each independently of the other hydrogen or unsubstituted or substituted $C_1$-$C_4$alkyl, $D_1$ is the radical of a diazo component, which is itself a mono- or dis-azo dye or contains such a dye, $D_2$ has the same definition as $D_1$ or is a radical of formula

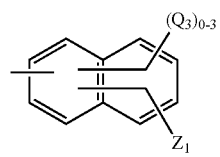

(2)

wherein $(Q_3)_{0-3}$ denotes from 0 to 3 identical or different substituents selected from the group halogen, $C_1$-$C_4$alkyl, $C_1$-$C_4$alkoxy, carboxy and sulfo and $Z_1$ is a radical of formula —SO$_2$—Y (3a), —NH—CO—(CH$_2$)$_m$—SO$_2$—Y (3b), —CONH—(CH$_2$)$_n$—SO$_2$—Y (3c), —NH—CO—CH(Hal)-CH$_2$-Hal (3d) or —NH—CO—C(Hal)=CH$_2$ (3e), Y is vinyl or a —CH$_2$—CH$_2$—U radical and U is a group that is removable under alkaline conditions, m and n are each independently of the other the number 2, 3 or 4, and Hal is halogen, with the proviso that the dye of formula (1) does not contain a hydroxysulfonylmethyl group.

As $C_1$-$C_4$alkyl there come into consideration for $Q_1$, $Q_2$ and $Q_3$, each independently of the others, for example, methyl, ethyl, n-propyl, isopropyl, n-butyl, sec-butyl, isobutyl and tert-butyl, especially methyl and ethyl. The alkyl radicals $Q_1$ and $Q_2$ may be unsubstituted or may be substituted, for example, by hydroxy, sulfo, sulfato, cyano, carboxy, $C_1$-$C_4$alkoxy or by phenyl, preferably by hydroxy, sulfo, $C_1$-$C_4$alkoxy or by phenyl. The corresponding unsubstituted radicals are preferred.

Preferably, one of the radicals $Q_1$ and $Q_2$ is hydrogen and the other of the radicals $Q_1$ and $Q_2$ is one of the abovementioned unsubstituted or substituted $C_1$-$C_4$alkyl radicals.

$Q_1$ and $Q_2$ are especially preferably hydrogen.

As $C_1$-$C_4$alkoxy there come into consideration for $Q_3$, for example, methoxy, ethoxy, n-propoxy, isopropoxy, n-butoxy, isobutoxy and tert-butoxy, preferably methoxy and ethoxy and especially methoxy.

As halogen there come into consideration for $Q_3$, for example, fluorine, chlorine, bromine and iodine, preferably chlorine and bromine and especially chlorine.

Preferably, $(Q_3)_{0-3}$ denotes from 0 to 3 identical or different substituents selected from the group $C_1$-$C_4$alkyl, $C_1$-$C_4$alkoxy and sulfo, especially methyl, methoxy and sulfo.

Hal is, for example, chlorine or bromine, especially bromine.

As leaving group U there come into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-$C_4$alkyl and —OSO$_2$—N(C$_1$-$C_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H and more especially —OSO$_3$H.

Examples of suitable radicals Y are accordingly vinyl, β-bromo- or β-chloro-ethyl, β-acetoxy-ethyl, β-benzoyloxyethyl, β-phosphatoethyl, β-sulfatoethyl and β-thiosulfatoethyl.

Preferably, Y is independently vinyl, β-chloroethyl or β-sulfatoethyl, especially vinyl or β-sulfatoethyl.

m and n are preferably each independently of the other the number 2 or 3.

m is especially preferably the number 3.

n is especially preferably the number 2.

Preferably, $Z_1$ is a radical of formula (3a), (3b) or (3c), especially of formula (3a) or (3c) and more especially of formula (3a), the variables having the definitions and preferred meanings given hereinabove.

As substituents of the radical $D_1$ there come into consideration the substituents customary for azo dyes. The examples which follow may be mentioned: $C_1$-$C_4$alkyl, which is understood to include methyl, ethyl, n- and iso-propyl and n-, iso-, sec- and tert-butyl; $C_1$-$C_4$alkoxy, which is understood to include methoxy, ethoxy, n- and iso-propoxy and n-, iso-, sec and tert-butoxy; hydroxy-$C_1$-$C_4$alkoxy; phenoxy; $C_2$-$C_6$alkanoylamino unsubstituted or substituted in the alkyl moiety by hydroxy or by $C_1$-$C_4$alkoxy, such as, for example, acetylamino, hydroxyacetyl-amino, methoxyacetylamino or propionylamino; benzoylamino unsubstituted or substituted in the phenyl moiety by hydroxy, sulfo, halogen, $C_1$-$C_4$alkyl or by $C_1$-$C_4$alkoxy; $C_1$-$C_6$alkoxy-carbonylamino unsubstituted or substituted in the alkyl moiety by hydroxy, $C_1$-$C_4$alkyl or by $C_1$-$C_4$alkoxy; phenoxycarbonylamino unsubstituted or substituted in the phenyl moiety by hydroxy, $C_1$-$C_4$alkyl or by $C_1$-$C_4$alkoxy; amino; N—$C_1$-$C_4$alkyl- or N,N-di-$C_1$-$C_4$alkylamino unsubstituted or substituted in the alkyl moiety/moieties by hydroxy, $C_1$-$C_4$alkoxy, carboxy, cyano, halogen, sulfo, sulfato, phenyl or by sulfophenyl, such as, for example, methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfato-ethylamino, N-ethyl-N-(3-sulfobenzyl)amino, N-(β-sulfoethyl)-N-benzylamino; cyclohexylamino; N-phenylamino or N—$C_1$-$C_4$alkyl-N-phenylamino unsubstituted or substituted in the phenyl moiety by nitro, $C_1$-$C_4$alkyl, $C_1$-$C_4$alkoxy, carboxy, halogen or by sulfo; $C_1$-$C_4$-alkoxycarbonyl, for example methoxy- or ethoxy-carbonyl; trifluoromethyl; nitro; cyano; halogen, which is generally understood to include, for example, fluorine, bromine and especially chlorine; ureido; hydroxy; carboxy; sulfo; sulfomethyl; carbamoyl; carbamido; sulfamoyl; N-phenylsulfamoyl or N—$C_1$-$C_4$alkyl-N-phenylsulfamoyl unsubstituted or substituted in the phenyl moiety by sulfo or by carboxy; methyl- or ethyl-sulfonyl; and $C_1$-$C_4$alkylsulfonylamino.

Fibre-reactive radicals are also suitable as substituents of the radical $D_1$.

Fibre-reactive radicals, such as, for example, the above-mentioned radicals of formulae (3a) to (3e), are to be understood as being those which are capable of reacting with the hydroxy groups of cellulose, with the amino, carboxy, hydroxy and thiol groups in wool and silk or with the amino groups and, possibly, with the carboxy groups of synthetic polyamides, to form covalent chemical bonds. The fibre-reactive radicals are generally bonded to the dye radical directly or by way of a bridging member. Suitable fibre-reactive radicals are, for example, those which contain at least one removable substituent at an aliphatic, aromatic or heterocyclic radical or in which the said radicals contain a radical suitable for reaction with the fibre material, for example a vinyl radical.

A fibre-reactive radical present in $D_1$ corresponds, for example, to the above formula (3a), (3b), (3c), (3d) or (3e) or to the formula

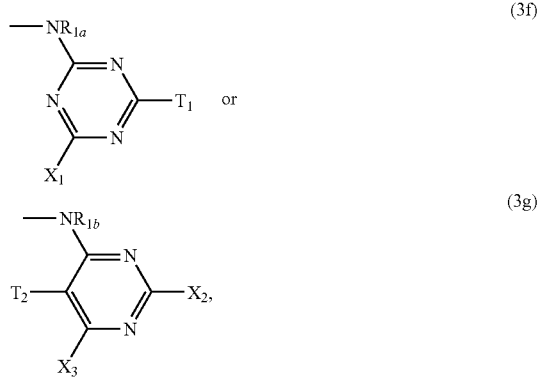

wherein
$X_1$ is halogen, 3-carboxypyridin-1-yl or 3-carbamoylpyridin-1-yl,
$T_1$ independently has the same definition as $X_1$, is a non-fibre-reactive substituent or is a fibre-reactive radical of formula

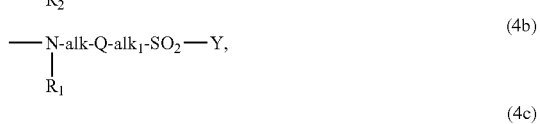
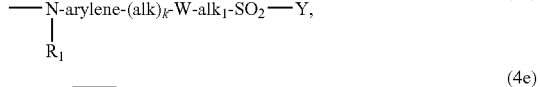
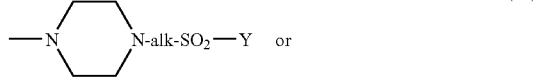
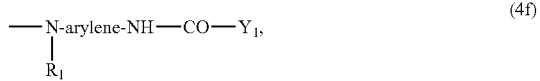

wherein
$R_1$, $R_{1a}$ and $R_{1b}$ are each independently of the others hydrogen or $C_1$-$C_4$alkyl,
$R_2$ is hydrogen, $C_1$-$C_4$alkyl unsubstituted or substituted by hydroxy, sulfo, sulfato, carboxy or by cyano, or a radical

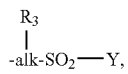

$R_3$ is hydrogen, hydroxy, sulfo, sulfato, carboxy, cyano, halogen, $C_1$-$C_4$alkoxycarbonyl, $C_1$-$C_4$-alkanoyloxy, carbamoyl or the group —$SO_2$—Y,
alk and $alk_1$ are each independently of the other linear or branched $C_1$-$C_6$alkylene,
arylene is a phenylene or naphthylene radical unsubstituted or substituted by sulfo, carboxy, $C_1$-$C_4$alkyl, $C_1$-$C_4$alkoxy or by halogen,
Q is an —O— or —$NR_1$— radical wherein $R_1$ is as defined above,
W is a —$SO_2$—$NR_2$—, —$CONR_2$— or —$NR_2CO$— group, wherein $R_2$ is as defined above,
Y has the definition and preferred meanings given hereinabove,
$Y_1$ is a —CH(Hal)-$CH_2$-Hal or —C(Hal)=$CH_2$ group and Hal has the definition and preferred meanings given hereinabove,
k is the number 0 or 1,
$X_2$ is halogen or $C_1$-$C_4$alkylsulfonyl,
$X_3$ is halogen or $C_1$-$C_4$alkyl and
$T_2$ is hydrogen, cyano or halogen.

$R_1$, $R_{1a}$ and $R_{1b}$ are each independently of the others preferably hydrogen, methyl or ethyl and especially hydrogen.

$R_2$ is preferably hydrogen or $C_1$-$C_4$alkyl, such as, for example, methyl, ethyl, propyl, isopropyl, butyl, isobutyl, sec-butyl or tert-butyl and especially hydrogen, methyl or ethyl. Especially preferably, $R_2$ is hydrogen.

$R_3$ is preferably hydrogen.

When $T_1$ is a non-fibre-reactive substituent it may be, for example, hydroxy; $C_1$-$C_4$alkoxy; $C_1$-$C_4$alkylthio unsubstituted or substituted, for example, by hydroxy, carboxy or by sulfo; amino; amino mono- or di-substituted by $C_1$-$C_8$alkyl, wherein the alkyl may itself be substituted, for example, by sulfo, sulfato, hydroxy, carboxy or by phenyl, especially by sulfo or by hydroxy, and may be interrupted one or more times by the radical —O—; cyclohexylamino; morpholino; N—$C_1$-$C_4$alkyl-N-phenylamino, phenylamino or naphthylamino, wherein the phenyl or naphthyl is unsubstituted or substituted, for example, by $C_1$-$C_4$alkyl, $C_1$-$C_4$alkoxy, $C_2$-$C_4$alkanoylamino, carboxy, sulfo or by halogen and the alkyl is unsubstituted or substituted, for example, by hydroxy, sulfo or by sulfato.

Examples of suitable non-fibre-reactive substituents $T_1$ are amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, 2,5-disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As a non-fibre-reactive substituent, $T_1$ is preferably $C_1$-$C_4$alkoxy; $C_1$-$C_4$alkylthio unsubstituted or substituted by hydroxy, carboxy or by sulfo; hydroxy; amino; N-mono- or N,N-di-$C_1$-$C_4$-alkylamino unsubstituted or substituted in the alkyl moiety/moieties by hydroxy, sulfato or by sulfo; morpholino; phenylamino unsubstituted or substituted on the phenyl ring by sulfo, carboxy, acetylamino, chlorine, methyl or by methoxy; or N—$C_1$-$C_4$alkyl-N-phenylamino unsubstituted or substituted on the phenyl ring in the same way as phenylamino and in which the alkyl is unsubstituted or substituted by hydroxy, sulfo or by sulfato; or naphthylamino unsubstituted or substituted by from 1 to 3 sulfo groups.

Especially preferred non-fibre-reactive substituents $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino and N—$C_1$-$C_4$-alkyl-N-phenylamino.

$X_1$ is preferably halogen, for example fluorine, chlorine or bromine and especially preferably chlorine or fluorine.

$T_2$, $X_2$ and $X_3$ as halogen are, for example, fluorine, chlorine or bromine, especially chlorine or fluorine.

$X_2$ as $C_1$-$C_4$alkylsulfonyl is, for example, ethylsulfonyl or methylsulfonyl and especially methylsulfonyl.

$X_3$ as $C_1$-$C_4$alkyl is, for example, methyl, ethyl, n- or iso-propyl or n-, iso- or tert-butyl and especially methyl.

$X_2$ and $X_3$ are preferably each independently of the other chlorine or fluorine.

$T_2$ is preferably cyano or chlorine.

alk and $alk_1$ are each independently of the other, for example, a methylene, ethylene, 1,3-propylene, 1,4-butylene, 1,5-pentylene or 1,6-hexylene radical or a branched isomer thereof.

Preferably, alk and $alk_1$ are each independently of the other a $C_1$-$C_4$alkylene radical and especially preferably an ethylene radical or propylene radical.

arylene is preferably an unsubstituted or, for example, sulfo-, methyl-, methoxy- or carboxy-substituted 1,3- or 1,4-phenylene radical, and especially preferably an unsubstituted 1,3- or 1,4-phenylene radical.

Q is preferably —NH— or —O— and especially preferably —O—.

W is preferably a group of formula —CONH— or —NHCO—, especially a group of formula —CONH—.

k is preferably the number 0.

The reactive radicals of formulae (4a) to (4f) are preferably such radicals in which W is a group of formula —CONH—, $R_1$ is hydrogen, methyl or ethyl, $R_2$ and $R_3$ are each hydrogen, Q is the radical —O— or —NH—, alk and $alk_1$ are each independently of the other ethylene or propylene, arylene is phenylene unsubstituted or substituted by methyl, methoxy, carboxy or by sulfo, Y is vinyl or β-sulfatoethyl, $Y_1$ is —CHBr—$CH_2$Br or —CBr=$CH_2$ and k is the number 0.

A fibre-reactive radical present in $D_1$ preferably corresponds to a radical of the above formula (3a), (3b), (3c), (3d), (3e) or (3f), wherein Y is vinyl, β-chloroethyl or β-sulfatoethyl, Hal is bromine, $R_{1a}$ is hydrogen, m and n are each independently of the other the number 2 or 3, $X_1$ is halogen, $T_1$ is $C_1$-$C_4$alkoxy; $C_1$-$C_4$alkylthio; hydroxy; amino; N-mono- or N,N-di-$C_1$-$C_4$alkylamino unsubstituted or substituted in the alkyl moiety/moieties by hydroxy, sulfato or by sulfo; morpholino; phenylamino or N—$C_1$-$C_4$alkyl-N-phenylamino unsubstituted or substituted on the phenyl ring by sulfo, carboxy, acetylamino, chlorine, methyl or by methoxy, and in which the alkyl is unsubstituted or substituted by hydroxy, sulfo or by sulfato; or naphthylamino unsubstituted or substituted by from 1 to 3 sulfo groups, or $T_1$ is a fibre-reactive radical of formula

$$—NH—(CH_2)_{2\text{-}3}—SO_2—Y \qquad (4a'),$$

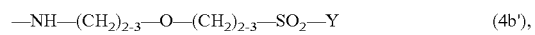

$$—NH—(CH_2)_{2\text{-}3}—O—(CH_2)_{2\text{-}3}—SO_2—Y \qquad (4b'),$$

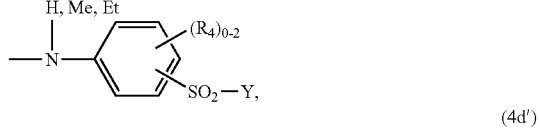

(4c')

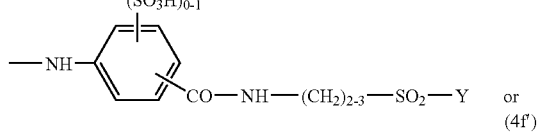

(4d')

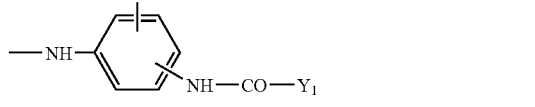

(4f')

especially (4c') or (4d'), wherein $(R_4)_{0\text{-}2}$ denotes from 0 to 2 identical or different substituents from the group halogen, $C_1$-$C_4$-alkyl, $C_1$-$C_4$alkoxy and sulfo, preferably from the group $C_1$-$C_4$alkyl, $C_1$-$C_4$alkoxy and sulfo and especially from the group methyl, methoxy and sulfo, Y has the definition and preferred meanings given hereinabove, and $Y_1$ is a —CH(Br)—$CH_2$—Br or —C(Br)=$CH_2$ group.

In the case of the radicals of formulae (4a') and (4b'), Y is preferably β-chloroethyl. In the case of the radicals of formulae (4c') and (4d'), Y is preferably vinyl or β-sulfatoethyl.

A preferred embodiment of the present invention relates to dyes wherein $D_1$ corresponds to a radical of formula

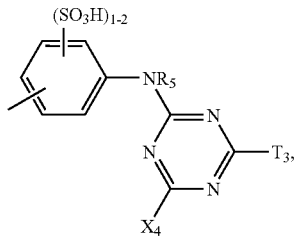
(5)

wherein $R_5$ has the definition and preferred meanings given hereinabove for $R_1$, $R_{1a}$ and $R_{1b}$, $X_4$ has the definition and preferred meanings given hereinabove for $X_1$, and is especially chlorine, and $T_3$ is a monoazo- or disazo-amino radical of formula

(6) or

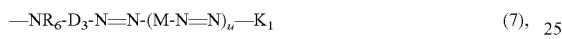
(7), wherein $D_3$ is the radical of a diazo component, of the benzene or naphthalene series, M is the radical of a middle component, of the benzene or naphthalene series, $K_1$ is the radical of a coupling component, of the benzene, naphthalene, pyrazolone, 6-hydroxypyridone-(2) or acetoacetic acid arylamide series, $R_6$ has the definition and preferred meanings given hereinabove for $R_1$, $R_{1a}$ and $R_{1b}$, and u is the number 0 or 1, wherein $D_3$, M and $K_1$ may carry substituents customary for azo dyes.

The expression "substituents customary for azo dyes" is understood to include both fibre-reactive and non-fibre-reactive substituents, such as, for example, the substituents indicated above for $D_1$.

As non-fibre-reactive substituents for $D_3$, M and $K_1$ in $T_3$ there come into consideration preferably $C_1$-$C_4$alkyl or $C_1$-$C_4$alkoxy each of which may themselves be substituted by hydroxy, $C_1$-$C_4$alkoxy, sulfo or by sulfato; halogen; carboxy; sulfo; nitro; cyano; trifluoromethyl; sulfamoyl; carbamoyl; amino; ureido; hydroxy; sulfomethyl; $C_2$-$C_4$alkanoylamino; $C_1$-$C_4$alkylsulfonylamino; benzoylamino unsubstituted or substituted on the phenyl ring by $C_1$-$C_4$alkyl, $C_1$-$C_4$alkoxy, halogen or by sulfo; and phenyl unsubstituted or substituted by $C_1$-$C_4$alkyl, $C_1$-$C_4$alkoxy, halogen, carboxy or by sulfo.

The monoazo- or disazo-amino radicals of formula (6) or (7) contain preferably at least one sulfo group.

Preferred monoazo- and disazo-amino radicals $T_3$ are the radicals of formulae

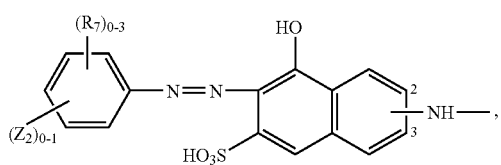
(8a)

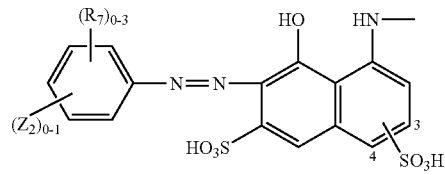
(8b)

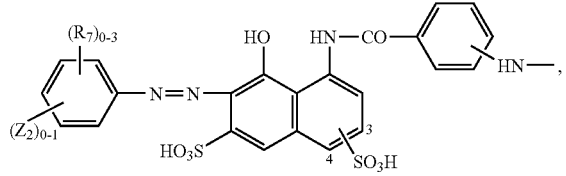
(8c)

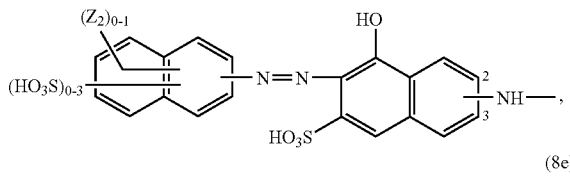
(8d)

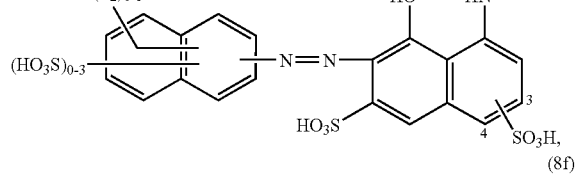
(8e)

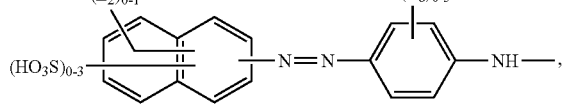
(8f)

wherein $(R_7)_{0-3}$ denotes from 0 to 3 identical or different substituents from the group $C_1$-$C_4$-alkyl, $C_1$-$C_4$alkoxy, $C_2$-$C_4$alkanoylamino, halogen, carboxy and sulfo, $(R_8)_{0-3}$ denotes from 0 to 3 identical or different substituents from the group halogen, nitro, cyano, trifluoromethyl, sulfamoyl, carbamoyl, $C_1$-$C_4$alkyl; $C_1$-$C_4$alkoxy unsubstituted or substituted by hydroxy, sulfato or by $C_1$-$C_4$alkoxy; amino, $C_2$-$C_4$alkanoylamino, ureido, hydroxy, carboxy, sulfomethyl, $C_1$-$C_4$alkylsulfonylamino and sulfo, preferably from the group halogen, $C_1$-$C_4$alkyl; $C_1$-$C_4$alkoxy unsubstituted or substituted by hydroxy, sulfato or by $C_1$-$C_4$alkoxy; amino, $C_1$-$C_4$alkanoylamino, ureido and sulfo, and $Z_2$ is a radical of formula (3a), (3b), (3c), (3d), (3e) or (3f), preferably (3a), (3b), (3c), 3d) or (3e) and especially (3a), the mentioned fibre-reactive radicals having the definitions and preferred meanings given hereinabove,

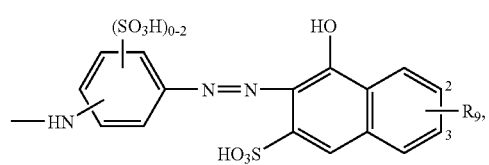
(8g)

-continued

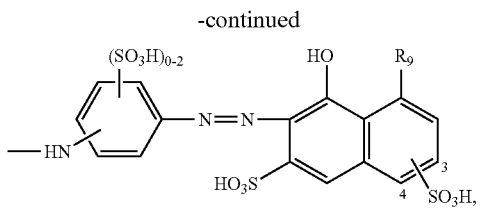
(8h)

wherein R₉ is benzoylamino, $C_2$-$C_4$alkanoylamino, for example acetylamino or propionylamino, or a radical of the above formula (3f), preferably $C_2$-$C_4$alkanoylamino or benzoylamino, $R_{1a}$, $T_1$ and $X_1$ in the radical of formula (3f) each having the definitions and preferred meanings given hereinabove,

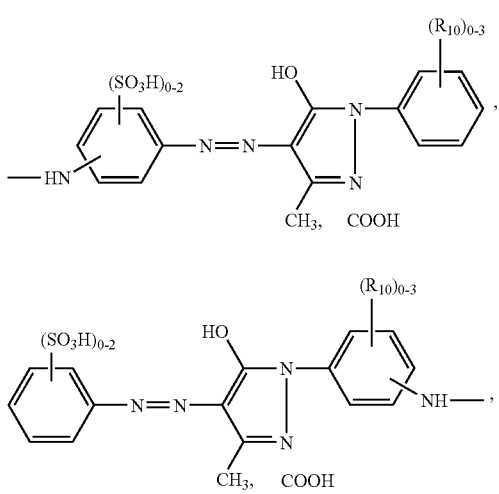
(8i)

(8j)

wherein $(R_{10})_{0-3}$ denotes from 0 to 3 identical or different substituents from the group $C_1$-$C_4$alkyl, $C_1$-$C_4$alkoxy, halogen, carboxy and sulfo,

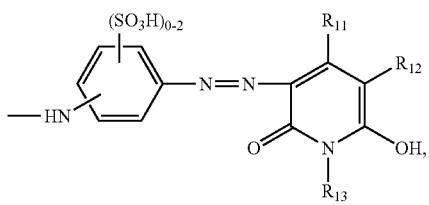
(8k)

wherein $R_{11}$ and $R_{13}$ are each independently of the other hydrogen, $C_1$-$C_4$alkyl or phenyl, and $R_{12}$ is hydrogen, cyano, carbamoyl or sulfomethyl,

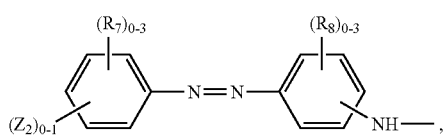
(8l)

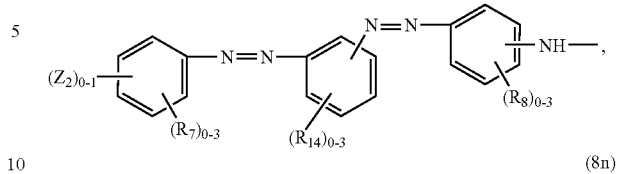
(8m)

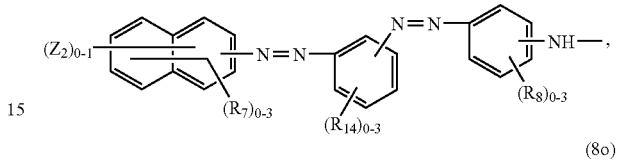
(8n)

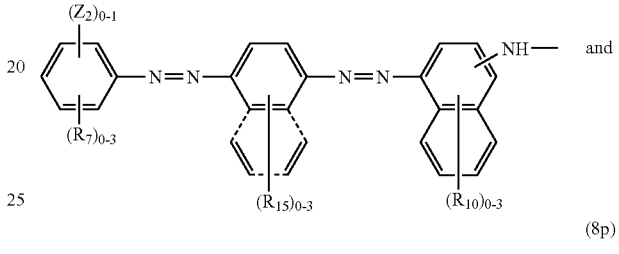
(8o)

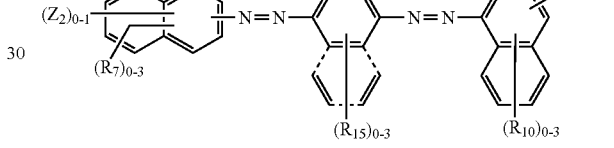
(8p)

wherein
$(R_7)_{0-3}$, $(R_8)_{0-3}$ and $(R_{10})_{0-3}$ each have the definitions and preferred meanings given hereinabove,
$(R_{14})_{0-3}$ and $(R_{15})_{0-3}$, each independently of the other, denotes from 0 to 3 identical or different substituents from the group $C_1$-$C_4$alkyl, $C_1$-$C_4$alkoxy, halogen, carboxy and sulfo, and $Z_2$ has the definition and preferred meanings given hereinabove.

The numbers at the naphthyl rings of the radicals of formulae (8a), (8b), (8c), (8d), (8e), (8g) and (8h) indicate the preferred bonding positions.

The radicals $(R_7)_{0-3}$ in the disazoamino radicals of formulae (8n) and (8p) preferably denote from 0 to 3 sulfo groups.

In an embodiment of interest, $Z_2$ in the radicals of formulae (8a), (8b), (8c), (8d), (8e), (8f), (8l), (8m), (8n), (8o) and (8p) is hydrogen.

Especially preferred monoazo- and disazo-amino radicals $T_3$ are the radicals of formulae (8a), (8b), (8d), (8e), (8f), (8k) and (8m), especially (8b), (8e), (8k) and (8m).

In a further preferred embodiment of the present invention, $D_1$ is a radical of formula $$-D_4-N{=}N-K_2 \qquad (9)$$

or $$D_4-N{=}N-K_3- \qquad (10),$$

preferably of formula (10), wherein $D_4$ is the radical of a diazo component, of the benzene or naphthalene series, $K_2$ is the radical of a coupling component, of the benzene, naphthalene, pyrazolone, 6-hydroxypyridone-(2) or acetoacetic acid arylamide series and $K_3$ is the radical of a coupling component, of the benzene or naphthalene series, wherein $D_4$, $K_2$ and $K_3$ may carry substituents customary for azo dyes.

The expression "substituents customary for azo dyes" is understood to include both fibre-reactive and non-fibre-reactive substituents, such as, for example, the substituents indicated above for $D_1$.

As non-fibre-reactive substituents for $D_4$, $K_2$ aund $K_3$ there come into consideration preferably $C_1$-$C_4$alkyl or $C_1$-$C_4$alkoxy each of which may themselves be substituted by hydroxy, $C_1$-$C_4$-alkoxy, sulfo or by sulfato; halogen; carboxy; sulfo; nitro; cyano; trifluoromethyl; sulfamoyl; carbamoyl; amino; ureido; hydroxy; sulfomethyl; $C_2$-$C_4$alkanoylamino; $C_1$-$C_4$alkylsulfonylamino; benzoylamino unsubstituted or substituted on the phenyl ring by $C_1$-$C_4$alkyl, $C_1$-$C_4$-alkoxy, halogen or by sulfo; and phenyl unsubstituted or substituted by $C_1$-$C_4$alkyl, $C_1$-$C_4$-alkoxy, halogen, carboxy or by sulfo.

As fibre-reactive substituents for $D_4$, $K_2$ and $K_3$ there come into consideration preferably the radicals of formulae (3a), (3b), (3c), (3d), (3e) and (3f), especially (3a) and (3f) and more especially (3a), the said radicals having the definitions and preferred meanings given hereinabove. In an embodiment of interest, a radical of formula (3a) is preferred as fibre-reactive substituent for $D_4$ and a radical of formula (3f) is preferred as fibre-reactive substituent for $K_3$.

Monoazo radicals of formula (9) or (10) contain preferably at least one sulfo group.

Preferred monoazo radicals $D_1$ of formula (10) correspond to the radicals of formulae

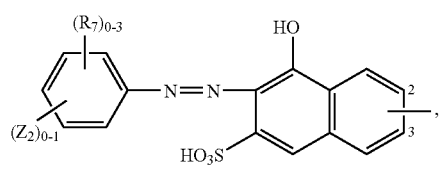
(10a)

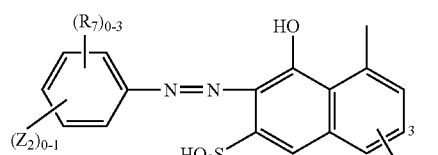
(10b)

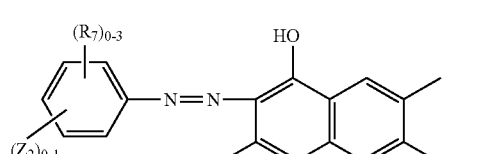
(10c)

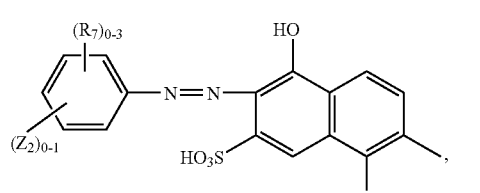
(10d)

wherein $(R_7)_{0-3}$ denotes from 0 to 3 identical or different substituents from the group $C_1$-$C_4$alkyl, $C_1$-$C_4$alkoxy, halogen, carboxy and sulfo and $Z_2$ is a fibre-reactive radical of formula (3a), (3c), (3d), (3e), (3f) or (3g), preferably (3a), (3c), (3d) or (3e) and especially (3a), wherein the said fibre-reactive radicals have the definitions and preferred meanings given hereinabove,

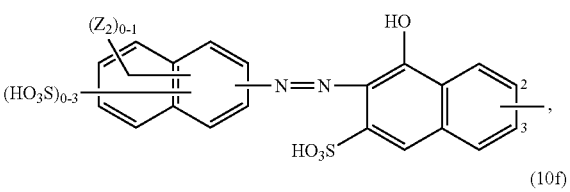
(10e)

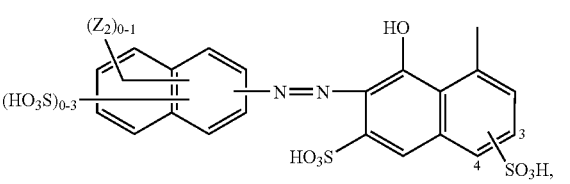
(10f)

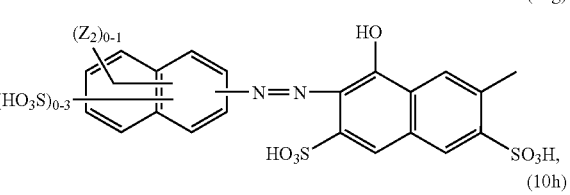
(10g)

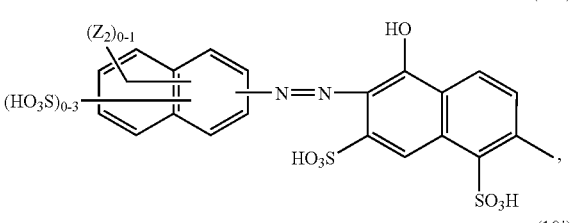
(10h)

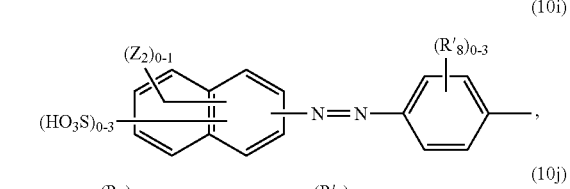
(10i)

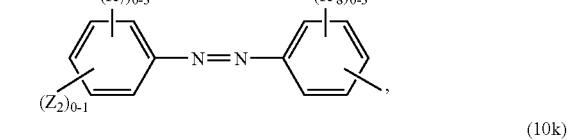
(10j)

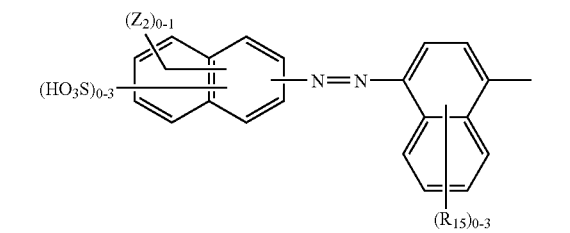
(10k)

and

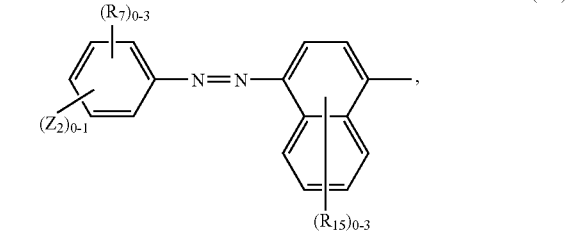
(10l)

wherein (R₇)₀₋₃ is as defined hereinabove, (R'₈)₀₋₃ denotes from 0 to 3 identical or different substituents from the group halogen, nitro, cyano, trifluoromethyl, sulfamoyl, carbamoyl, $C_1$-$C_4$alkyl; $C_1$-$C_4$alkoxy unsubstituted or substituted by hydroxy, sulfato or by $C_1$-$C_4$alkoxy; amino, $C_2$-$C_4$alkanoylamino, ureido, hydroxy, carboxy, sulfomethyl, $C_1$-$C_4$alkylsulfonylamino, sulfo and a fibre-reactive radical of formula (3f), preferably from the group $C_1$-$C_4$alkyl; $C_{1-4}$alkoxy unsubstituted or substituted by hydroxy, sulfato or by $C_1$-$C_4$alkoxy; amino, $C_2$-$C_4$alkanoylamino, ureido, sulfo and a fibre-reactive radical of formula (3f), wherein $R_{1a}$, $T_1$ and $X_1$ in the radical of formula (3f) have the definitions and preferred meanings given hereinabove, $(R_{15})_{0-3}$ denotes from 0 to 3 identical or different substituents from the group $C_1$-$C_4$alkyl, $C_1$-$C_4$alkoxy, halogen, carboxy and sulfo and is preferably sulfo, and $Z_2$ has the definition and preferred meanings given hereinabove.

The numbers at the naphthyl rings of the radicals of formulae (10a), (10b), (10e) and (10f) indicate the preferred bonding positions.

When R'₈ is a radical of formula (3f), then especially $R_{1a}$ is hydrogen, $T_1$ is amino; N-mono- or N,N-di-$C_1$-$C_4$alkylamino unsubstituted or substituted in the alkyl moiety/moieties by hydroxy, sulfato or by sulfo; morpholino; phenylamino unsubstituted or substituted on the phenyl ring by sulfo, carboxy, acetylamino, chlorine, methyl or by methoxy; or N—$C_1$-$C_4$alkyl-N-phenylamino unsubstituted or substituted on the phenyl ring in the same way as phenylamino and in which alkyl is unsubstituted or substituted by hydroxy, sulfo or by sulfato; or naphthylamino unsubstituted or substituted by from 1 to 3 sulfo groups, and $X_1$ is chlorine.

As a radical of formula (10), $D_1$ is especially preferably a radical of formula (10i), (10j), (10k) or (10l), especially of formula (10j) or (10l).

Preferably, the radical $D_1$ corresponds to a radical of formula (5) or (11)

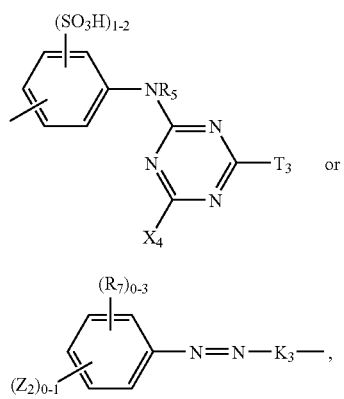

wherein $R_5$ is hydrogen or $C_1$-$C_4$alkyl, preferably hydrogen, methyl or ethyl and especially hydrogen, $(R_7)_{0-3}$ denotes from 0 to 3 identical or different substituents selected from the group halogen, $C_1$-$C_4$alkyl, $C_1$-$C_4$alkoxy, $C_2$-$C_4$alkanoylamino, carboxy and sulfo, preferably from the group $C_1$-$C_4$alkyl, $C_1$-$C_4$alkoxy, $C_2$-$C_4$alkanoylamino and sulfo, $X_4$ is fluorine or chlorine, preferably chlorine, $T_3$ is a radical of the above formula (8a), (8b), (8d), (8e), (8f), (8k) or (8m), preferably (8b), (8e), (8k) or (8m), wherein the variables have the definitions and preferred meanings given hereinabove, $Z_2$ is a fibre-reactive radical of the above formula (3a), (3c), (3d), (3e), (3f) or (3g), preferably (3a), (3c), (3d) or (3e) and especially (3a), wherein the variables have the definitions and preferred meanings given hereinabove, and $K_3$ is the radical of a coupling component of formula

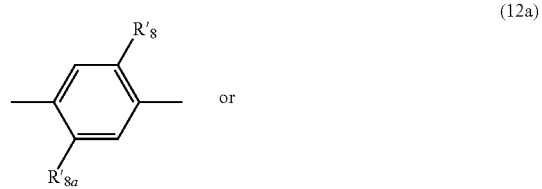

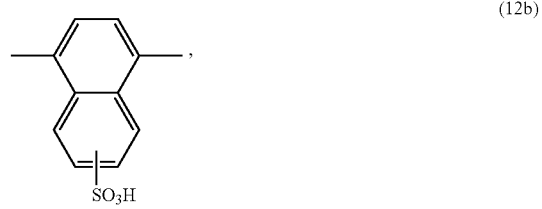

wherein

R'₈ is hydrogen, sulfo, or $C_1$-$C_4$alkoxy unsubstituted or substituted in the alkyl moiety by hydroxy or by sulfato, and R'$_{8a}$ is hydrogen, $C_1$-$C_4$alkyl, $C_1$-$C_4$alkoxy, $C2$-$C_4$alkanoylamino, ureido or a radical of the above formula (3f), preferably hydrogen, $C_1$-$C_4$alkyl, $C_1$-$C_4$alkoxy, $C_2$-$C_4$alkanoylamino or ureido, wherein $R_{1a}$, $T_1$ and $X_1$ in the radical of forromula (3f) have the definitions and preferred meanings given hereinabove, and, especially, $R_{1a}$ is hydrogen, $T_1$ is amino; N-mono- or N,N-di-$C_1$-$C_4$alkylamino unsubstituted or substituted in the alkyl moiety/moieties by hydroxy, sulfato or by sulfo; morpholino; phenylamino unsubstituted or substituted on the phenyl ring by sulfo, carboxy, acetylamino, chlorine, methyl or by methoxy; or N—$C_1$-$C_4$alkyl-N-phenylamino unsubstituted or substituted on the phenyl ring in the same way as phenylamino and in which the alkyl is unsubstituted or substituted by hydroxy, sulfo or by sulfato; or naphthylamino unsubstituted or substituted by from 1 to 3 sulfo groups, and $X_1$ is chlorine.

There come into consideration as $C_1$-$C_4$alkyl for $R_7$ and R'$_{8a}$, each independently of the other, for example, methyl, ethyl, n-propyl, isopropyl, n-butyl, sec-butyl, tert-butyl and isobutyl, preferably methyl and ethyl and especially methyl.

There come into consideration as $C_1$-$C_4$alkoxy for $R_7$, R'₈ and R'$_{8a}$, each independently of the others, for example, methoxy, ethoxy, n-propoxy, isopropoxy, n-butoxy and isobutoxy, preferably methoxy and ethoxy. $R_7$ and R'$_{8a}$ are especially methoxy. R'₈ is unsubstituted or may be substituted in the alkyl moiety by hydroxy or by sulfato.

There come into consideration as halogen for $R_7$, each independently of any other(s), for example, fluorine, chlorine and bromine, preferably chlorine and bromine and especially chlorine.

There come into consideration as $C_2$-$C_4$alkanoylamino for $R_7$ and R'$_{8a}$, for example, acetylamino and propionylamino, especially acetylamino.

There comes into consideration as a radical of formula (3f) for R'$_{8a}$ preferably a radical wherein $R_{1a}$, is hydrogen, $T_1$ is amino; N-mono- or N,N-di-$C_1$-$C_4$alkylamino unsubstituted or substituted in the alkyl moiety/moieties by hydroxy, sulfato or by sulfo; morpholino; phenylamino or N—$C_1$-$C_4$alkyl-N-phenylamino unsubstituted or substituted on the phenyl ring by sulfo, carboxy, acetylamino, chlorine, methyl or by methoxy and in which the alkyl is unsubstituted or substituted by hydroxy, sulfo or by sulfato; or naphthylamino unsubstituted or substituted by from 1 to 3 sulfo groups, and $X_1$ is fluorine or chlorine, preferably chlorine.

In an embodiment of interest, $D_2$ corresponds to a radical of formula (2), wherein $(Q_3)_{0-3}$ and $Z_1$ each have the definitions and preferred meanings given hereinabove.

Preferably, the radical $D_2$ corresponds to a radical of formula

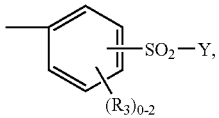 (2a)

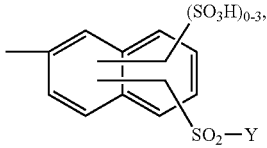 (2b)

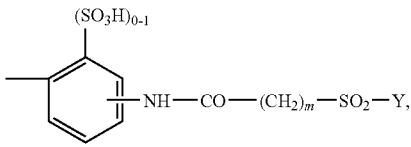 (2c)

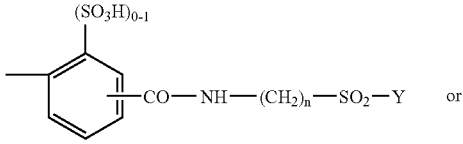 (2d)

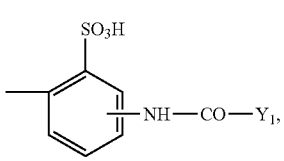 (2e)

wherein $(R_3)_{0-2}$ denotes from 0 to 2 identical or different substituents selected from the group halogen, $C_1$-$C_4$alkyl, $C_1$-$C_4$alkoxy and sulfo, preferably from the group methyl, methoxy and sulfo, $Y_1$ is a —CH(Br)—$CH_2$—Br or —C(Br)=$CH_2$ group, Y is vinyl or β-sulfatoethyl, m is the number 2 or 3, preferably 2, and n is the number 2 or 3, preferably 3.

Especially preferably, $D_2$ is a radical of the above formula (2a), (2b) or (2d), especially (2a); in an embodiment of interest the radical of formula (2a) is a radical of formula

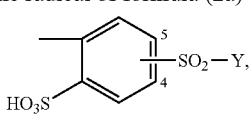 (2aa)

wherein
Y is vinyl or β-sulfatoethyl, and the numbers given in the formula indicate the possible bonding positions of —$SO_2$—Y, the 4-position being preferred.

A preferred embodiment of the present invention relates to reactive dyes of formula (1)

wherein $Q_1$ and $Q_2$ are hydrogen, $D_1$ corresponds to a radical of the above formula (5) or (11) wherein $R_5$ is hydrogen or $C_1$-$C_4$alkyl, preferably hydrogen, methyl or ethyl and especially hydrogen, $(R_7)_{0-3}$ denotes from 0 to 3 identical or different substituents selected from the group halogen, $C_1$-$C_4$alkyl, $C_1$-$C_4$alkoxy, $C_2$-$C_4$alkanoylamino, carboxy and sulfo, preferably from the group $C_1$-$C_4$alkyl, $C_1$-$C_4$alkoxy, $C_2$-$C_4$alkanoylamino and sulfo, $X_4$ is fluorine or chlorine, preferably chlorine, $T_3$ is a radical of the above formula (8a), (8b), (8d), (8e), (8f), (8k) or (8m), preferably (8b), (8e), (8k) or (8m), wherein the variables have the definitions and preferred meanings given hereinabove, $Z_2$ is a fibre-reactive radical of the above formula (3a), (3c), (3d), (3e), (3f) or (3g), preferably (3a), (3c), (3d) or (3e) and especially (3a), wherein the variables have the definitions and preferred meanings given hereinabove, and $K_3$ is the radical of a coupling component of the above formula (12a) or (12b) wherein $R'_8$ is hydrogen, sulfo, or $C_1$-$C_4$alkoxy unsubstituted or substituted in the alkyl moiety by hydroxy or by sulfato, and $R'_{8a}$ is hydrogen, $C_1$-$C_4$alkyl, $C_1$-$C_4$alkoxy, $C2$-$C_4$alkanoylamino, ureido or a radical of the above formula (3f), wherein $R_{1a}$, $T_1$ and $X_1$ in the radical of formula (3f) have the definitions and preferred meanings given hereinabove, and $D_2$ is a radical of the above formula (2aa) wherein
Y is vinyl or β-sulfatoethyl, and the numbers given in formula (2aa) indicate the possible bonding positions of —$SO_2$—Y, the 4-position being preferred.

The present invention relates also to a process for the preparation of dyes of formula (1) which comprises (i) diazotisation of approximately one molar equivalent of an amine of formula $$D_2\text{-}NH_2 \quad (13)$$

in customary manner and reaction with approximately one molar equivalent of a compound of formula (14)

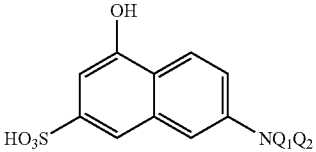

to form a compound of formula

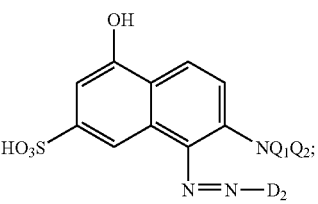 (15a)

and (ii) diazotisation of approximately one molar equivalent of an amine of formula $$D_1\text{-}NH_2 \quad (16)$$

in customary manner and reaction with approximately one molar equivalent of the compound of formula (15a) obtained according to (i) to form a compound of formula (1) wherein $D_1$, $D_2$, $Q_1$ and $Q_2$ each have the definitions and preferred meanings given hereinabove.

The diazotisation of the amines of formulae (13) and (16) is carried out in a manner known per se, for example using a nitrite, for example an alkali metal nitrite such as sodium nitrite, in a mineral acid medium, for example in a hydrochloric acid medium, at temperatures of, for example, from −5 to 40° C. and preferably at from 0 to 20° C.

The coupling to the coupling components of formulae (14) and (15a) is carried out in a manner known per se at acidic or neutral to slightly alkaline pH values, for example a pH value of from 0 to 8, and at temperatures of, for example, from −5 to 40° C., preferably from 0 to 30° C.

The first coupling—(i)—takes place in an acidic medium, for example at a pH of from 0 to 4, and the second coupling—(ii)—at elevated pH values, in a slightly acidic, neutral or slightly alkaline medium, for example a pH value of from 4 to 8.

By proceeding as described hereinabove but, instead of using approximately one molar equivalent each of the amines of formulae (13) and (16) in process steps (i) and (ii), using in each case approximately one molar equivalent of a mixture of at least two, preferably two, non-identical amines, for example a 1:1 molar mixture of the compounds of formulae (13) and (16), there is obtained first of all, according to (i), a mixture of compounds of formulae

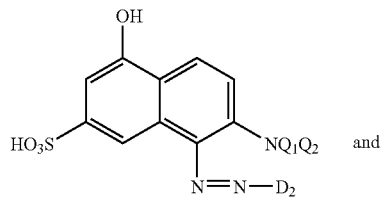 (15a)

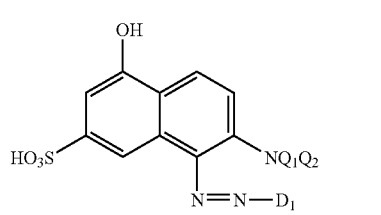 (15b)

and, on further reaction of the mixture of compounds of formulae (15a) and (15b) according to (ii), a mixture of dyes of formulae (1a), (1b), (1c) and (1d)

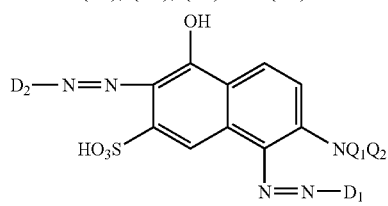 (1a)

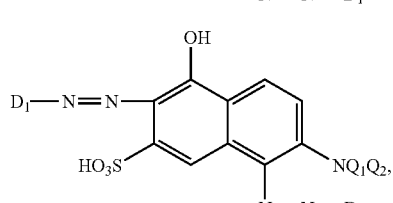 (1b)

-continued

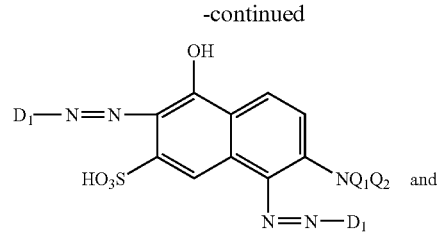 (1c)

and

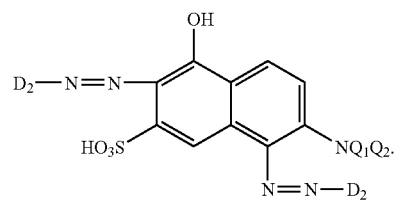 (1d)

The present invention accordingly relates also to dye mixtures that comprise at least one dye of formulae (1a) and (1b) together with at least one dye of formulae (1c) and (1d), especially one dye each of formulae (1a), (1b), (1c) and (1d), wherein $D_1$, $D_2$, $Q_1$ and $Q_2$ each have the definitions and preferred meanings given hereinabove and $D_1$ and $D_2$ are not identical.

The ratio of the dyes of formulae (1a), (1b), (1c) and (1d) in the mixture can vary within wide limits and depends on the ratio of the particular amines $D_1$-$NH_2$ and $D_2$-$NH_2$ used according to (i) and (ii).

The above dye mixtures contain, for example, from 5 to 95% by weight, especially from 10 to 90% by weight and preferably from 20 to 80% by weight, of a dye of formula (1a) and/or (1b), based on the total amount of the dyes of formulae (1a), (1b), (1c) and (1d) in the mixture.

Where appropriate, the end product may, in addition, be subjected to a conversion reaction. Such a conversion reaction is, for example, the conversion of the radical Y denoting —$CH_2CH_2$—U or another reactive group capable of conversion to a vinyl moiety into the corresponding vinyl form by treatment with dilute sodium hydroxide solution, such as, for example, the conversion of the β-sulfatoethylsulfonyl or β-chloroethylsulfonyl group into the vinylsulfonyl radical. Such reactions are known per se.

The compounds of formulae (13), (14) and (16) are known or can be obtained in a manner known per se.

For example, the compound of formula (16) wherein $D_1$ is a radical of the above formula (5) can be prepared by condensation of approximately one molar equivalent of 2,4,6-trichloro-s-triazine or 2,4,6-trifluoro-s-triazine first with approximately one molar equivalent of a compound of formula $T_3$-H    (17), at a pH value in the neutral range and at low temperature, for example from 0 to 5° C., and then with approximately one molar equivalent of a compound of formula

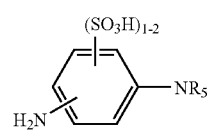 (18)

at a slightly acidic to neutral pH value, for example pH 4.5-7.5, and at a temperature of, for example, from 0 to 30° C.

Such condensation reactions are known and are described, for example, in EP-A-0 260 227 and U.S. Pat. No. 4,841,049.

Instead of the compound of formula (17), a preliminary product, for example a diazo component or coupling component, may alternatively be used in the process, the radical $T_3$ being produced only in the further course of the process by a corresponding diazotisation and coupling reaction.

The reactive dyes according to the invention are either in the form of their free acids or, preferably, in the form of salts thereof. Salts that come into consideration are, for example, alkali metal, alkaline earth metal and ammonium salts, and salts of an organic amine. Sodium, lithium, potassium and ammonium salts and the salt of the mono-, di- or tri-ethanolamine may be mentioned as examples.

The reactive dyes according to the invention are suitable for dyeing and printing an extremely wide variety of materials, especially hydroxyl-group-containing or nitrogen-containing fibre materials. Examples are paper, silk, leather, wool, polyamide fibres and polyurethanes and also especially cellulosic fibre materials of all kinds. Such fibre materials are, for example, natural cellulosic fibres, such as cotton, linen and hemp, and also cellulose and regenerated cellulose. The dyes according to the invention are also suitable for dyeing or printing hydroxyl-group-containing fibres present in blend fabrics, e.g. blends of cotton with polyester fibres or polyamide fibres.

The present invention accordingly relates also to the use of the reactive dyes according to the invention in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of aqueous dye solutions and dye print pastes. They are suitable both for the exhaust method and for dyeing in accordance with the pad-dyeing method; they can be used at low dyeing temperatures and require only short steaming times in the pad-steam process. The degrees of fixing are high and unfixed dye can be washed off easily, the difference between the degree of exhaust and the degree of fixing being remarkably small, that is to say the soaping loss being very low. The reactive dyes according to the invention are also suitable for printing, especially on cotton, but are equally suitable also for printing nitrogen-containing fibres, for example wool or silk or blend fabrics that contain wool.

The dyeings and prints produced using the reactive dyes according to the invention have a high tinctorial strength and a high fibre-to-dye binding stability in both the acidic and the alkaline range, and furthermore have good fastness to light and very good wet-fastness properties, such as fastness to washing, to water, to sea water, to cross-dyeing and to perspiration. The dyeings obtained exhibit fibre levelness and surface levelness.

The present invention relates furthermore to aqueous inks that comprise a reactive dye of formula (1) wherein $Q_1$, $Q_2$, $D_1$ and $D_2$ each have the definitions and preferred meanings given hereinabove.

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone, diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, poly-alkylene glycols, e.g. polyethylene glycol or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexane-triol; and $C_1$-$C_4$alkyl ethers of polyhydric alcohols, e.g. 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially substances that inhibit fungal and/or bacterial growth. Such additives are usually used in amounts of from 0.01 to 1% by weight, based on the total weight of the ink.

The inks can be prepared in customary manner by mixing together the individual constituents in the desired amount of water.

The inks according to the invention are suitable especially for use in recording systems of a kind in which an ink is forced out of a small aperture in the form of droplets that are directed onto a substrate on which an image is formed. Suitable substrates are, for example, paper, textile fibre materials or plastics films. Suitable recording systems are, for example commercially available inkjet printers for use in paper or textile printing, or writing instruments, such as fountain pens or ballpoint pens, and especially inkjet printers.

Depending on the use, it may be necessary, for example, for the viscosity or other physical properties of the ink, especially properties that have an influence on the affinity for the substrate in question, to be adapted accordingly.

As examples of paper that can be printed with the inks according to the invention there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films that can be printed with the inks according to the invention are, for example, transparent or cloudy/opaque. Suitable plastics films are, for example, 3M Transparency Film.

As textile fibre materials there come into consideration, for example, nitrogen-containing or hydroxy-group-containing fibre materials, for example textile fibre materials of cellulose, silk, wool or synthetic polyamides, preferably cellulose.

The present invention accordingly relates also to a method of printing textile fibre materials, paper or plastics films, preferably textile fibre materials or paper, and especially textile fibre materials, according to the ink-jet printing method, which comprises using an aqueous ink that comprises a reactive dye of formula (1) wherein $Q_1$, $Q_2$, $D_1$ and $D_2$ each have the definitions and preferred meanings given hereinabove.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). For the process according to the invention, printing by means of a piezo ink-jet head is preferred, but preference is given also to printing according to the continuous ink-jet method.

The recordings, for example prints, produced are distinguished especially by a high tinctorial strength and a high colour brilliancy as well as by good light-fastness and wet-fastness properties.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.

EXAMPLE 1

32.5 parts of an amine of formula $D_{10}$-$NH_2$, wherein $D_{10}$ is a radical of formula

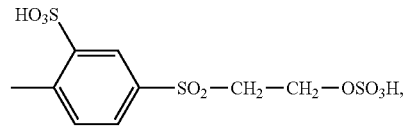

are introduced into 100 parts of water and stirred well. At 10° C., there are added to the resulting suspension first of all 22.8 parts of a 4N sodium nitrite solution and then 41 parts of a 31% naphthalenesulfonic acid solution. Stirring is then carried out for 3 hours at from 15 to 20° C.

EXAMPLES 2 to 19

The diazo compounds of the amines indicated in Table 1 can be prepared analogously to the procedure described in Example 1 by using, instead of the amine of formula $D_{10}$-$NH_2$ mentioned in Example 1, an equimolar amount of the amines of formula $D_{xy}$-$NH_2$ indicated in Table 1.

TABLE 1

| Ex. | Amine $D_{xy}$-$NH_2$ | $D_{xy}$ |
|---|---|---|
| 2 | $D_{11}$-$NH_2$ | $D_{11}$ = (phenyl)-$SO_2$-$CH_2$-$CH_2$-$OSO_3H$ |
| 3 | $D_{12}$-$NH_2$ | $D_{12}$ = (phenyl)-$SO_2$-$CH_2$-$CH_2$-$OSO_3H$ |

TABLE 1-continued
| Ex. | Amine $D_{xy}$-$NH_2$ | $D_{xy}$ |
|---|---|---|
| 4 | $D_{13}$-$NH_2$ | $D_{13}$ = 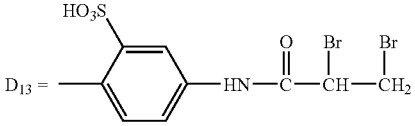 |
| 5 | $D_{14}$-$NH_2$ | $D_{14}$ = —C$_6$H$_4$—CONH—(CH$_2$)$_2$—SO$_2$—(CH$_2$)$_2$—OSO$_3$H 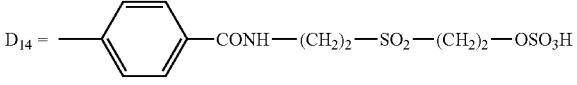 |
| 6 | $D_{15}$-$NH_2$ | $D_{15}$ = 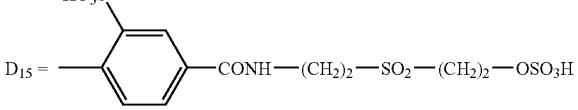 |
| 7 | $D_{16}$-$NH_2$ | $D_{16}$ = 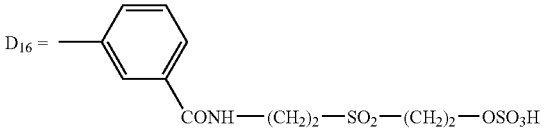 |
| 8 | $D_{17}$-$NH_2$ | $D_{17}$ = 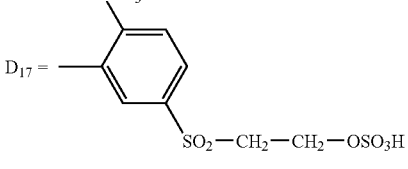 |
| 9 | $D_{18}$-$NH_2$ | $D_{18}$ = 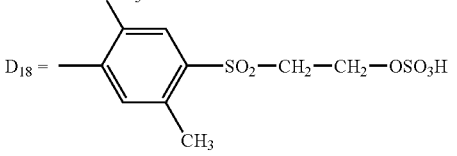 |
| 10 | $D_{19}$-$NH_2$ | $D_{19}$ = 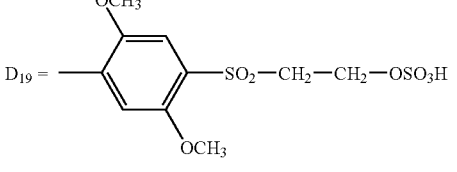 |
| 11 | $D_{20}$-$NH_2$ | $D_{20}$ = 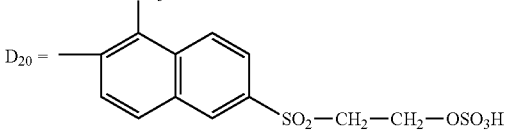 |
| 12 | $D_{21}$-$NH_2$ | $D_{21}$ = 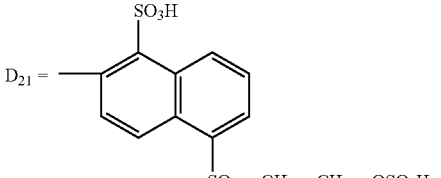 |

TABLE 1-continued

| Ex. | Amine $D_{xy}$-$NH_2$ | $D_{xy}$ |
|---|---|---|
| 13 | $D_{22}$-$NH_2$ | $D_{22}$ = naphthalene substituted with $SO_2$—$CH_2$—$CH_2$—$OSO_3H$ |
| 14 | $D_{23}$-$NH_2$ | $D_{23}$ = naphthalene substituted with $SO_2$—$CH_2$—$CH_2$—$OSO_3H$ and $SO_3H$ |
| 15 | $D_{24}$-$NH_2$ | $D_{24}$ = naphthalene substituted with $SO_2$—$CH_2$—$CH_2$—$OSO_3H$ |
| 16 | $D_{25}$-$NH_2$ | $D_{25}$ = methyl-naphthalene substituted with $SO_2$—$CH_2$—$CH_2$—$OSO_3H$ |
| 17 | $D_{26}$-$NH_2$ | $D_{26}$ = phenyl with $HO_3S$ and $HN$—$\overset{O}{\overset{\|}{C}}$—$\overset{Br}{\overset{\|}{CH}}$—$\overset{Br}{\overset{\|}{CH_2}}$ |
| 18 | $D_{27}$-$NH_2$ | $D_{27}$ = phenyl with $HO_3S$ and $NHCO$—$(CH_2)_3$—$SO_2$—$(CH_2)_2$—$Cl$ |
| 19 | $D_{28}$-$NH_2$ | $D_{28}$ = phenyl with $HO_3S$ and $NHCO$—$(CH_2)_3$—$SO_2$—$(CH_2)_2$—$Cl$ |

EXAMPLE 20 a) 36.9 parts of cyanuric chloride are stirred in 150 parts of ice/water and a small amount of wetting agent. At from 0 to 2° C., a solution of 25.25 parts of taurine in 50 parts of water is introduced in the course of 40 minutes and condensation is carried out at a pH of from 7 to 8 by the dropwise addition of 2N sodium hydroxide solution. Stirring is then carried out at from 0 to 5° C. and a pH of from 7 to 7.5 until cyanuric chloride can no longer be detected. A neutral solution of 39.48 parts of 1,3-phenylenediamine-4-sulfonic acid in 100 parts of water is then added. Condensation is carried out at a temperature of from 5 to 20° C. and the pH is maintained at from 8 to 9 by the addition of 2N sodium hydroxide solution. When condensation is complete, the reaction solution is salted out using KCl, filtered and washed with concentrated KCl solution. After drying, the intermediate of formula

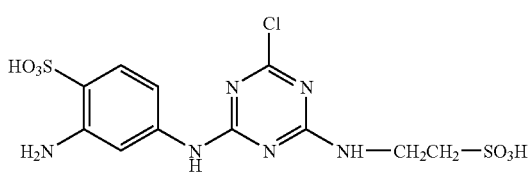

is obtained.

b) 68 parts of the compound according to a) are suspended in 300 parts of water. The diazotized amine from Example 3, which is prepared according to Example 1 from 45 parts of the amine of formula $D_{12}$-$NH_2$, is then added in the course of 10 minutes at from 0 to 5° C., and the pH is maintained at from 6 to 8.5 using soda solution (20%). When coupling is complete, the yellow dye is precipitated using KCl, and the suspension obtained is filtered and dried in vacuo, yielding the monoazo compound of formula

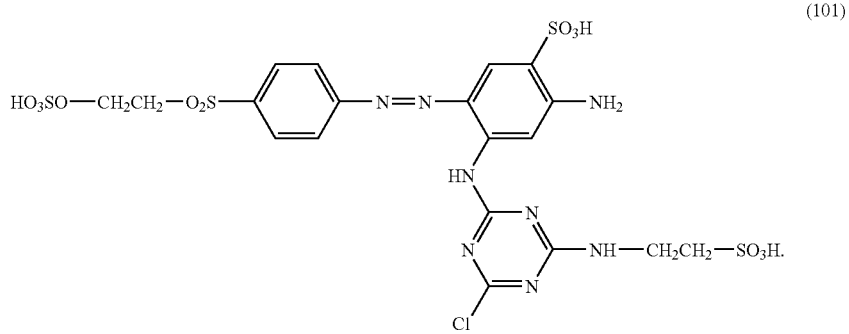

(101)

c) 83 parts of the compound according to Example b) are dissolved in 700 parts of water and diazotized according to the customary method with sodium nitrite and HCl at from 0 to 5° C.

EXAMPLE 21

A solution of 21.5 parts of 2-amino-5-naphthol-7-sulfonic acid in 250 parts of water (pH 7) is added dropwise at from 0 to 5° C. to the acid suspension of the diazo compound of the amine of formula $D_{10}$-$NH_2$ obtained according to Example 1. The mixture is then heated to room temperature and stirred for approximately 5 h until coupling is complete (first coupling). The reaction mixture is then cooled to from 5 to 10° C., the pH value is increased to approximately 4.5 using an aqueous sodium hydrogen carbonate solution, and the suspension of the diazo compound obtained according to Example 20c) is slowly added dropwise, the pH value being maintained during the dropwise addition at approximately 4.5 by the addition of an aqueous sodium hydrogen carbonate solution and the temperature being maintained at approximately 5° C. After the dropwise addition, the pH value is adjusted to 6 (second coupling). When coupling is complete, the dye solution is freed of salt by dialysis and concentrated by evaporation in vacuo. A compound is obtained which in the form of the free acid corresponds to formula ($\lambda_{max}$: 550 nm), which dyes wool and cellulose in a bluish violet shade having good allround fastness properties.

EXAMPLES 22 TO 39v

A compound of the general formula

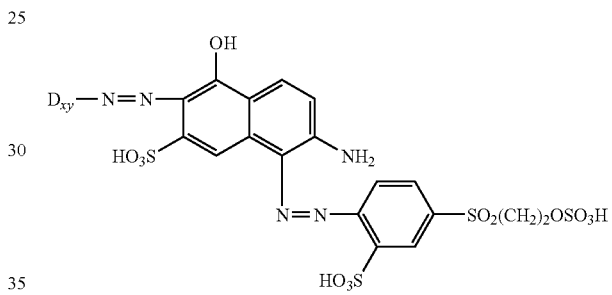

can be prepared analogously to the procedure described in Example 21 by using, instead of the amine of formula (101), an equimolar amount of one of the amines of formula $D_{xy}$-$NH_2$ indicated in Table 2. The dyes dye wool and celluose in orange to blue shades having good allround fastness properties.

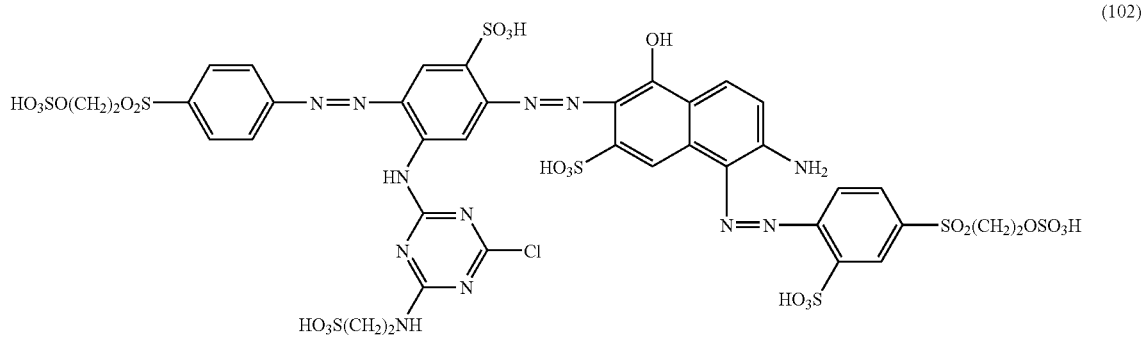

(102)

TABLE 2

| Ex. | Amine $D_{xy}$-$NH_2$ | $D_{xy}$ | $\lambda_{max}$ [nm] |
|---|---|---|---|
| 22 | $D_{29}$-$NH_2$ | $D_{29}$ = 2-(4-amino-6-chloro-1,3,5-triazin-2-ylamino)-5-[(4-(2-sulfooxyethylsulfonyl)phenyl)azo]-4-sulfobenzene | 550 |
| 23 | $D_{30}$-$NH_2$ | $D_{30}$ = 2-sulfo-4-[(4-sulfophenyl)azo]phenyl | 536 |
| 24 | $D_{31}$-$NH_2$ | $D_{31}$ = 4-methoxy-2-methyl-5-[(2-sulfo-4-(2-sulfooxyethylsulfonyl)phenyl)azo]phenyl | 570 |
| 25 | $D_{32}$-$NH_2$ | $D_{32}$ = 4-methoxy-2-methoxy-5-[(2-sulfo-4-(2-sulfooxyethylsulfonyl)phenyl)azo]phenyl | 583 |
| 26 | $D_{33}$-$NH_2$ | $D_{33}$ = 4-methoxy-2-acetamido-5-[(2-sulfo-4-(2-sulfooxyethylsulfonyl)phenyl)azo]phenyl | 572 |
| 27 | $D_{34}$-$NH_2$ | $D_{34}$ = 4-(2-hydroxyethoxy)-2-methyl-5-[(2-sulfo-4-(2-sulfooxyethylsulfonyl)phenyl)azo]phenyl | 570 |
| 28 | $D_{35}$-$NH_2$ | $D_{35}$ = 2-sulfo-5-methoxy-4-[(4-(2-sulfooxyethylsulfonyl)phenyl)azo]phenyl | 536 |
| 29 | $D_{36}$-$NH_2$ | $D_{36}$ = 4-methoxy-2-acetamido-5-[(2-methoxy-5-methyl-4-(2-sulfooxyethylsulfonyl)phenyl)azo]phenyl | 570 |

Note: The $D_{xy}$ column contains structural diagrams of azo dye compounds. Descriptions given are approximate name renderings of the depicted structures.

TABLE 2-continued

| | | | |
|---|---|---|---|
| 30 | $D_{37}$-$NH_2$ | $D_{37}$ = [structure: naphthalene with SO₃H at 6 or 7 position, linked via N=N to benzene with SO₃H and -SO₂-CH₂-CH₂-OSO₃H] | 574 |
| 31 | $D_{38}$-$NH_2$ | $D_{38}$ = [structure: HO₃S-benzene-N=N-benzene-SO₂-CH₂-CH₂-OSO₃H] | 535 |
| 32 | $D_{39}$-$NH_2$ | $D_{39}$ = [structure: HO₃S-benzene (with HNCOCH₃)-N=N-benzene-SO₂-CH₂-CH₂-OSO₃H] | 541 |
| 33 | $D_{40}$-$NH_2$ | $D_{40}$ = [structure: HO₃S-benzene (with HNCOCH₃)-N=N-benzene (with HO₃S)-SO₂-CH₂-CH₂-OSO₃H] | 540 |
| 34 | $D_{41}$-$NH_2$ | $D_{41}$ = [structure: HO₃S-benzene (with OCH₃)-N=N-benzene (with H₃CO and CH₃)-SO₂-CH₂-CH₂-OSO₃H] | 543 |
| 35 | $D_{42}$-$NH_2$ | $D_{42}$ = [structure: HO₃S-benzene (with OCH₃)-N=N-benzene (with HO₃S)-SO₂-CH₂-CH₂-OSO₃H] | 538 |
| 36 | $D_{43a}$-$NH_2$ – $D_{43g}$-$NH_2$ | $D_{43a}$-$D_{43g}$ = [structure: HO₃S-benzene-NH-triazine(T₃)(Cl)] T₃: | |
| 36a | $D_{43a}$-$NH_2$ | $D_{43a}$ [structure: -NH-benzene-N=N-benzene(HO₃S)-N=N-benzene-SO₃H, with NHCONH₂] | 501 |

TABLE 2-continued

| | | | | |
|---|---|---|---|---|
| 36b | D₄₃b-NH₂ | D₄₃b | (structure) | 488 |
| 36c | D₄₃c-NH₂ | D₄₃c | (structure) | 486 |
| 36d | D₄₃d-NH₂ | D₄₃d | (structure) | 505 |
| 36e | D₄₃e-NH₂ | D₄₃e | (structure) | 516 |
| 36f | D₄₃f-NH₂ | D₄₃f | (structure) | 520 |
| 36g | D₄₃g-NH₂ | D₄₃g | (structure) | 520 |

TABLE 2-continued

| 37 | $D_{44a}$-$NH_2$ – $D_{44g}$-$NH_2$ | $D_{44a}$-$D_{44g}$ = structure with HO₃S, SO₃H substituents on benzene ring, NH linked to triazine bearing T₃ and Cl |
| --- | --- | --- |
| 37a | $D_{44a}$-$NH_2$ | $D_{44a}$: —NH—C₆H₃(NHCONH₂)—N=N—C₆H₃(SO₃H)—N=N—C₆H₄—SO₃H | 495 |
| 37b | $D_{44b}$-$NH_2$ | $D_{44b}$: —NH—C₆H₃(NHCONH₂)—N=N—naphthalene(SO₃H)₃ | 489 |
| 37c | $D_{44c}$-$NH_2$ | $D_{44c}$: —NH—C₆H₃(NHCOCH₃)—N=N—naphthalene(SO₃H)₃ | 487 |
| 37d | $D_{44d}$-$NH_2$ | $D_{44d}$: —NH—C₆H₃(NHCOCH₃)—N=N—naphthalene(SO₃H)₂ | 497 |
| 37e | $D_{44e}$-$NH_2$ | $D_{44e}$: —NH—C₆H₃(SO₃H)—N=N— pyridone with CH₃, CONH₂, OH, =O, N-CH₂CH₃ | 514 |
| 37f | $D_{44f}$-$NH_2$ | $D_{44f}$: —NH—C₆H₃(SO₃H)—N=N— pyridone with CH₃, CH₂SO₃H, OH, =O, N-CH₂CH₃ | 513 |

TABLE 2-continued
| | | | | |
|---|---|---|---|---|
| 37g | $D_{44g}$-NH$_2$ | $D_{44g}$ | 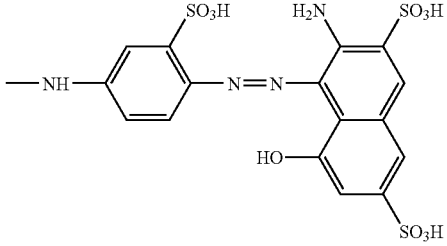 | 514 |
| 38 | $D_{45a}$-NH$_2$ – $D_{45v}$-NH$_2$ | $D_{45a}$-$D_{45v}$ = | 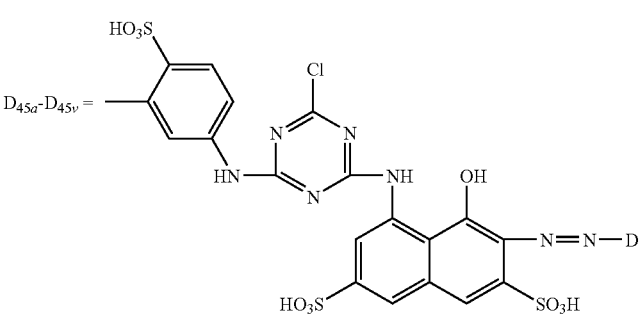 | |
| 39 | $D_{46a}$-NH$_2$ – $D_{46v}$-NH$_2$ | $D_{46a}$-$D_{46v}$ = | 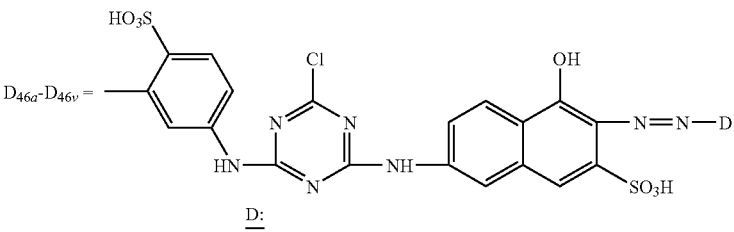 <br> D: | |
| 38a/39a | $D_{45a/46a}$-NH$_2$ | $D_{45a/46a}$ | 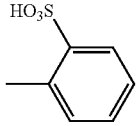 | 516 (39a)/ 497 (40a) |
| 38b/39b | $D_{45b/46b}$-NH$_2$ | $D_{45b/46b}$ | 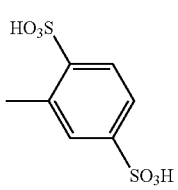 | 493 (40b) |
| 38c/39c | $D_{45c/46c}$-NH$_2$ | $D_{45c/46c}$ | 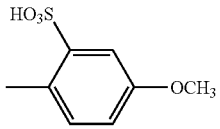 | 503 (40c) |
| 38d/39d | $D_{45d/46d}$-NH$_2$ | $D_{45d/46d}$ | 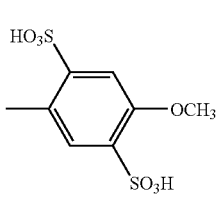 | 518 (39d) |
| 38e/39e | $D_{45e/46e}$-NH$_2$ | $D_{45e/46e}$ | 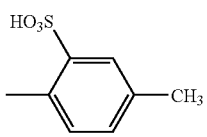 | 510 (39e) |

TABLE 2-continued

| | | | | |
|---|---|---|---|---|
| 38f/39f | $D_{45f/46f}$-NH$_2$ | $D_{45f/46f}$ | HO$_3$S—C$_6$H$_3$(CH$_3$)—NHCOCH$_3$ | 524 (39f) |
| 38g/39g | $D_{45g/46g}$-NH$_2$ | $D_{45g/46g}$ | 2-methyl-naphthalene-1-sulfonic acid (SO$_3$H) | 520 (39g) |
| 38h/39h | $D_{45h/46h}$-NH$_2$ | $D_{45h/46h}$ | 2-methyl-naphthalene-1,5-disulfonic acid | 518 (39h) |
| 38i/39i | $D_{45i/46i}$-NH$_2$ | $D_{45i/46i}$ | 2-methyl-6-(SO$_2$—CH$_2$CH$_2$—OSO$_3$H)-naphthalene-1-sulfonic acid | 520 (39i) |
| 38j/39j | $D_{45j/46j}$-NH$_2$ | $D_{45j/46j}$ | 6-methyl-2-(SO$_2$—CH$_2$CH$_2$—OSO$_3$H)-naphthalene | 528 (39j) |
| 38k/39k | $D_{45k/46k}$-NH$_2$ | $D_{45k/46k}$ | 2-methyl-5-(SO$_2$—CH$_2$CH$_2$—OSO$_3$H)-naphthalene-1-sulfonic acid | 518 (39k) |
| 38l/39l | $D_{45l/46l}$-NH$_2$ | $D_{45l/46l}$ | 6-methyl-1-(SO$_2$—CH$_2$CH$_2$—OSO$_3$H)-naphthalene | 522 (39l) |
| 38m/39m | $D_{45m/46m}$-NH$_2$ | $D_{45m/46m}$ | 6-methyl-4-(SO$_2$—CH$_2$CH$_2$—OSO$_3$H)-naphthalene-2-sulfonic acid | 520 (39m) |
| 38n/39n | $D_{45n/46n}$-NH$_2$ | $D_{45n/46n}$ | 4-methyl-phenyl-SO$_2$—CH$_2$CH$_2$—OSO$_3$H | 510 (39n) |

TABLE 2-continued

| | | | | |
|---|---|---|---|---|
| 38o/39o | $D_{45o/46o}$-$NH_2$ | $D_{45o/46o}$ | 4-methylphenyl-$SO_2$—$CH_2CH_2$—$OSO_3H$ | 508 (39o) |
| 38p/39p | $D_{45p/46p}$-$NH_2$ | $D_{45p/46p}$ | 3-$HO_3S$-4-methylphenyl-$SO_2$—$CH_2CH_2$—$OSO_3H$ | 512 (39p) |
| 38q/39q | $D_{45q/46q}$-$NH_2$ | $D_{45q/46q}$ | 4-$H_3CO$-3-methylphenyl-$SO_2$—$CH_2CH_2$—$OSO_3H$ | 525 (39q) |
| 38r/39r | $D_{45r/46r}$-$NH_2$ | $D_{45r/46r}$ | ($H_3CO$, $CH_3$, $CH_3$ substituted phenyl)-$SO_2$—$CH_2CH_2$—$OSO_3H$ | 520 (39r) |
| 38s/39s | $D_{45s/46s}$-$NH_2$ | $D_{45s/46s}$ | 3-methylphenyl-$CONH(CH_2)_2SO_2(CH_2)_2OSO_3H$ | 519 (39s) |
| 38t/39t | $D_{45t/46t}$-$NH_2$ | $D_{45t/46t}$ | 4-$HO_3S$-3-methylphenyl-$NHCO$—$CHBr$—$CH_2Br$ | 508 (39t) |
| 38u/39u | $D_{45u/46u}$-$NH_2$ | $D_{45u/46u}$ | 3-$HO_3S$-4-methylphenyl-$NHCO$—$CHBr$—$CH_2Br$ | 525 (39u) |
| 38v/39v | $D_{45v/46v}$-$NH_2$ | $D_{45v/46v}$ | 4-$HO_3S$-3-methylphenyl-$HNCO(CH_2)_3SO_2(CH_2)_2Cl$ | 514 (39v) |

EXAMPLES 40 TO 57

By proceeding as described in Example 21 but, instead of using the acid suspension of the diazo compound of the amine of formula $D_{10}$-$NH_2$, using an equimolar amount of the diazo compound of an amine of formula $D_{xy}$-$NH_2$, a dye of formula

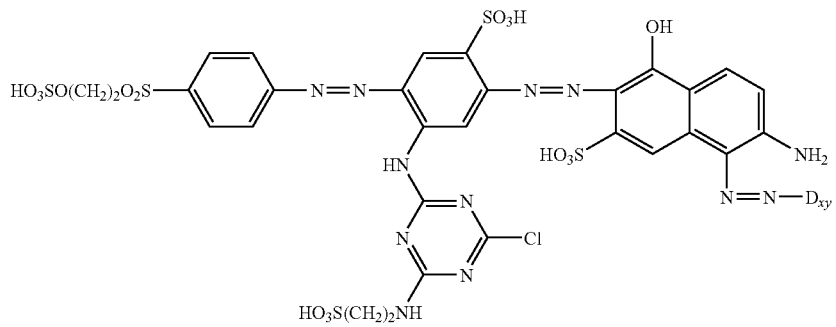

is obtained wherein $D_{xy}$ corresponds to one of the radicals listed in Table 3, the definitions given in Table 1 applying to that radical. The dyes dye wool and cellulose in bluish violet shades having good allround fastness properties.

TABLE 3

| Ex. | $D_{xy}$ |
|---|---|
| 40 | $D_{11}$ |
| 41 | $D_{12}$ |
| 42 | $D_{13}$ |
| 43 | $D_{14}$ |
| 44 | $D_{15}$ |
| 45 | $D_{16}$ |
| 46 | $D_{17}$ |
| 47 | $D_{18}$ |
| 48 | $D_{19}$ |
| 49 | $D_{20}$ |
| 50 | $D_{21}$ |
| 51 | $D_{22}$ |
| 52 | $D_{23}$ |
| 53 | $D_{24}$ |
| 54 | $D_{25}$ |
| 55 | $D_{26}$ |
| 56 | $D_{27}$ |
| 57 | $D_{28}$ |

EXAMPLES 58 TO 62

The compounds of the following formulae can be prepared analogously to the procedure described in Example 21

(103)
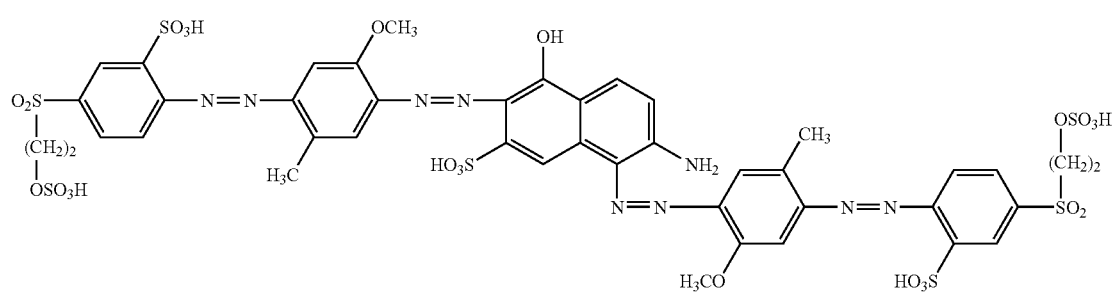
(λ_max: 588 nm)
(104)
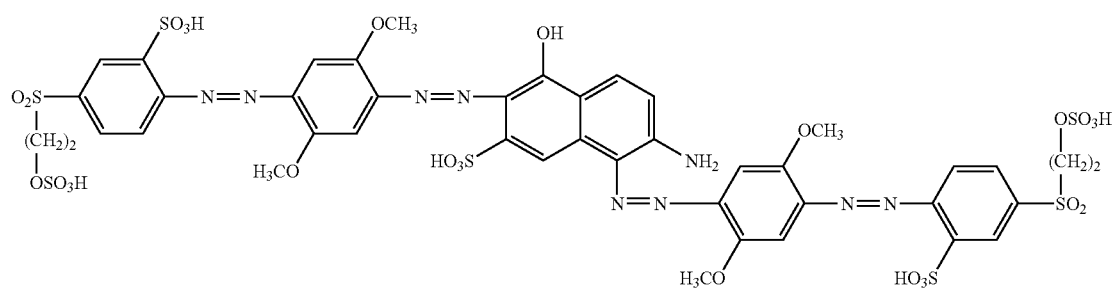
(λ_max: 604 nm)
(105)
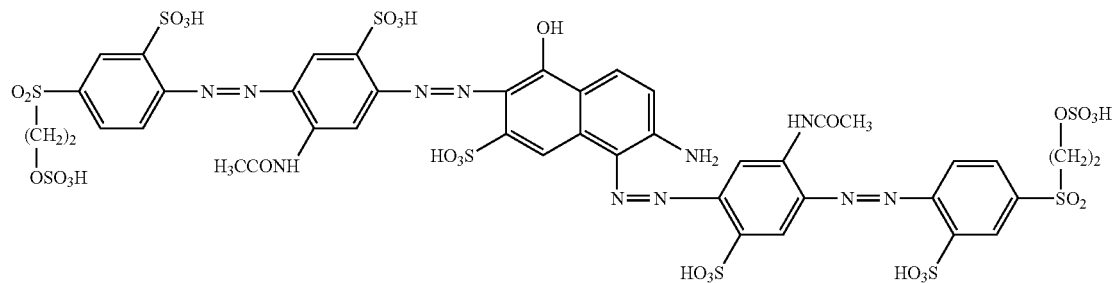
(λ_max: 554 nm)
(106)
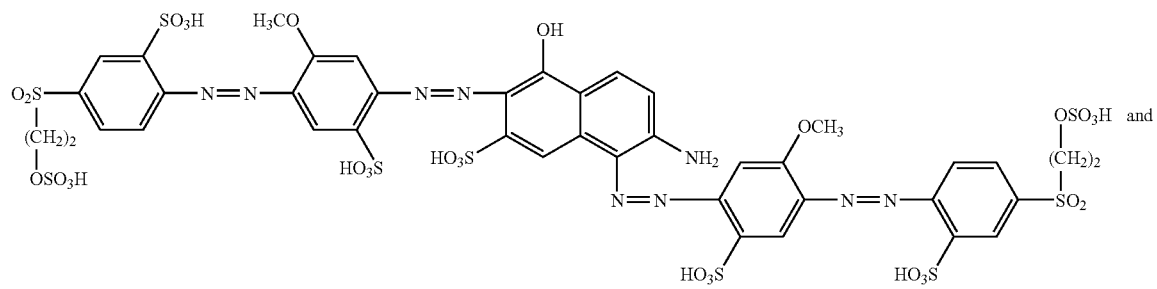
(λmax: 555 nm) and -continued (107)

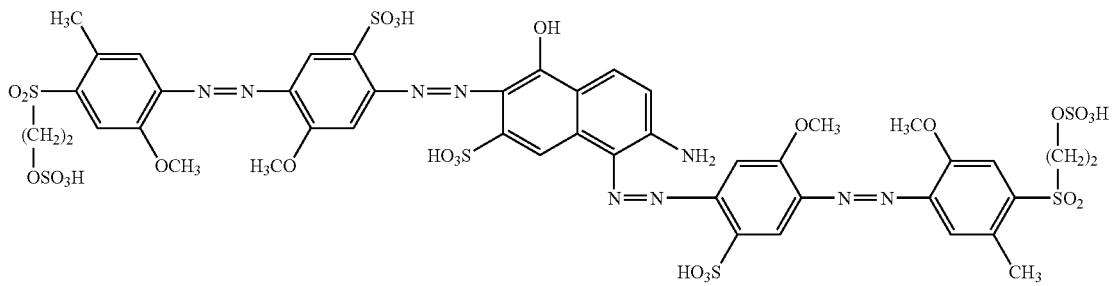

62 which dye wool and cellulose in violet to dark-blue shades having good allround fastness properties.

Dyeing Procedure I 100 parts of cotton fabric are introduced at 60° C. into 1500 parts of a dye bath containing 45 g/l of sodium chloride and 2 parts of the reactive dye obtained according to Example 21. After 45 minutes at 60° C., 20 g/l of calcined soda are added. Dyeing is continued for a further 45 minutes at that temperature. The dyed goods are then rinsed, soaped at the boil for a quarter of an hour with a non-ionic detergent, rinsed again and dried.

As an alternative to the above procedure, the dyeing can be carried out at 80° C. instead of at 60° C.

Dyeing Procedure II 0.1 part of the dye according to Example 21 is dissolved in 200 parts of water, and 0.5 part of sodium sulfate, 0.1 part of a levelling agent (based on the condensation product of a higher aliphatic amine and ethylene oxide) and also 0.5 part of sodium acetate are added. The pH is then adjusted to a value of 5.5 using acetic acid (80%). The dye bath is heated at 50° C. for 10 minutes and then 10 parts of a woollen fabric are added. Heating is then carried out in the course of approximately 50 minutes to a temperature of 100° C. and dyeing is carried out at that temperature for 60 minutes, after which the dye bath is allowed to cool and the dyed goods are removed. The woollen fabric is washed with hot and cold water, and is then spun and dried.

Printing Procedure I 3 parts of the dye obtained according to Example 21 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

Printing Procedure II (a) Mercerised cotton satin is pad-dyed with a liquor containing 30 g/l of sodium carbonate and 50 g/l of urea (70% liquor pick-up) and dried.

(b) Using a drop-on-demand inkjet head (bubble jet), the cotton satin pretreated according to Step (a) is printed with an aqueous ink containing 10% by weight of the reactive dye according to Example 21, 20% by weight of 1,2-propylene glycol and 70% by weight of water.

The print is dried completely and fixed in saturated steam for 8 minutes at 102° C., cold-rinsed, washed off at the boil, rinsed again and dried.

What is claimed is:
1. A reactive dye of formula

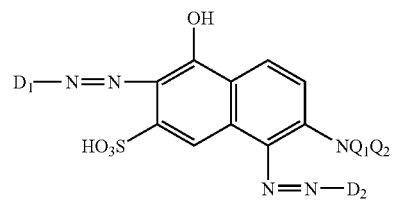

(1)

wherein
$Q_1$ and $Q_2$ are each independently of the other hydrogen or unsubstituted or substituted $C_1$-$C_4$ alkyl,
$D_1$ corresponds to a radical of formula (5) or (11)

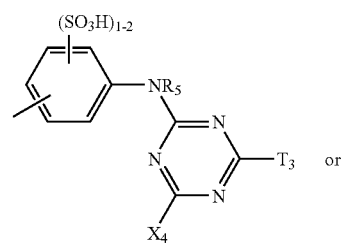

(5)

or (11)

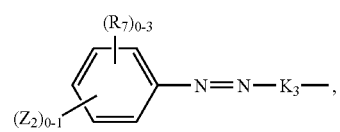

wherein
$R_5$ is hydrogen or $C_1$-$C_4$ alkyl,
$(R_7)_{0-3}$ denotes from 0 to 3 identical or different substituents selected from the group halogen, $C_1$-$C_4$ alkyl, $C_1$-$C_4$ alkoxy, $C_2$-$C_4$ alkanoylamino, carboxy and sulfo,
$X_4$ is fluorine or chlorine,
$Z_2$ is a fibre-reactive radical of formula —SO$_2$—Y      (3a), wherein Y is vinyl or β-sulfatoethyl, T$_3$ is a radical of formula

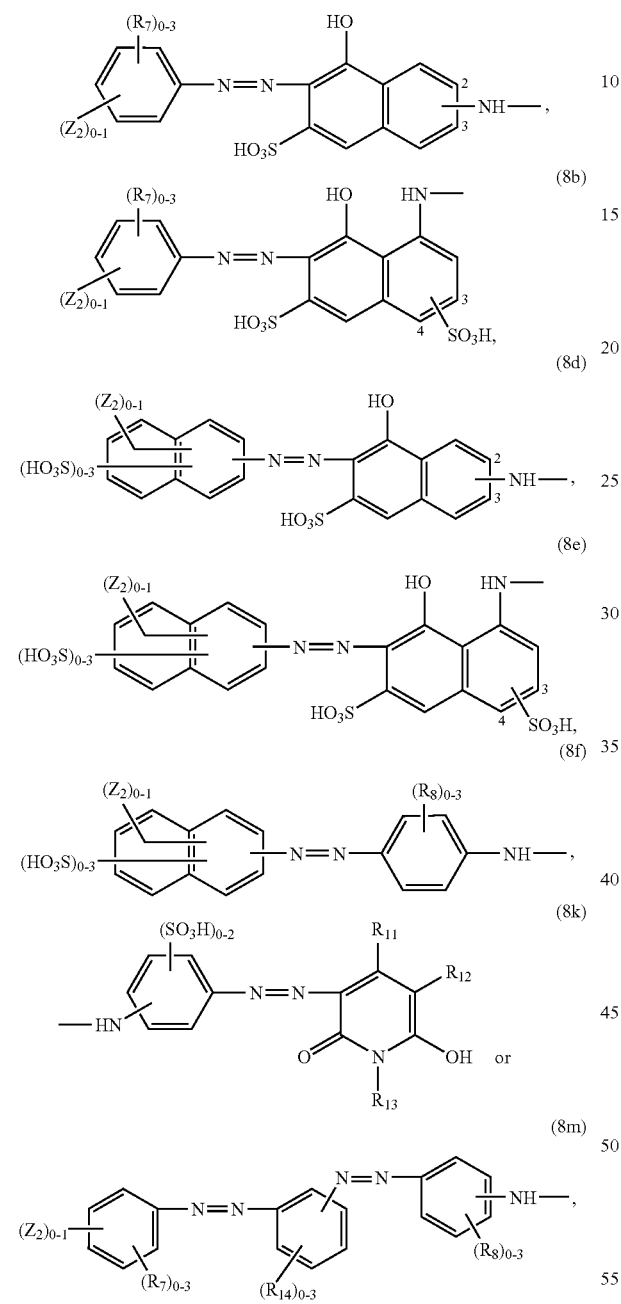

wherein ($R_7$)$_{0-3}$ is as defined hereinabove, ($R_8$)$_{0-3}$ denotes from 0 to 3 identical or different substituents from the group halogen, nitro, cyano, trifluoromethyl, sulfamoyl, carbamoyl, $C_1$-$C_4$ alkyl, $C_1$-$C_4$ alkoxy unsubstituted or substituted by hydroxy, sulfato or by $C_1$-$C_4$ alkoxy, amino, $C_2$-$C_4$ alkanoylamino, ureido, hydroxy, carboxy, sulfomethyl, $C_1$-$C_4$ alkylsulfonylamino and sulfo, $R_{11}$ and $R_{13}$ are each independently of the other hydrogen, $C_1$-$C_4$ alkyl or phenyl, $R_{12}$ is hydrogen, cyano, carbamoyl or sulfomethyl, ($R_{14}$)$_{0-3}$ denotes from 0 to 3 identical or different substituents from the group $C_1$-$C_4$ alkyl, $C_1$-$C_4$ alkoxy, halogen, carboxy and sulfo, and $Z_2$ is as defined hereinabove, $K_3$ is the radical of a coupling component of formula

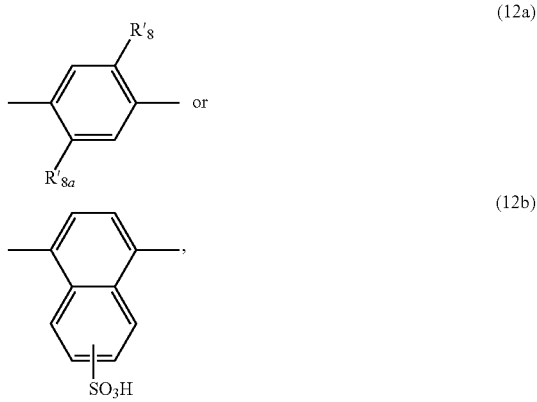

wherein

R'$_8$ is hydrogen, sulfo, or $C_1$-$C_4$ alkoxy unsubstituted or substituted in the alkyl moiety by hydroxy or by sulfato, and R'$_{8a}$ is hydrogen, $C_1$-$C_4$ alkyl, $C_1$-$C_4$ alkoxy, $C_2$-$C_4$ alkanoylamino, ureido or a radical of formula

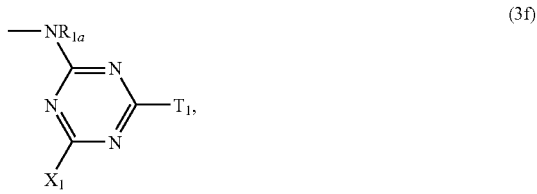

wherein $R_{1a}$ is hydrogen, $T_1$ is amino; N-mono- or N,N-di-$C_1$-$C_4$ alkylamino unsubstituted or substituted in the alkyl moiety/moieties by hydroxy, sulfato or by sulfo; morpholino; phenylamino unsubstituted or substituted on the phenyl ring by sulfo, carboxy, acetylamino, chlorine, methyl or by methoxy; or N—$C_1$-$C_4$ alkyl-N-phenylamino unsubstituted or substituted in the same way on the phenyl ring and in which the alkyl is unsubstituted or substituted by hydroxy, sulfo or by sulfato; or naphthylamino unsubstituted or substituted by from 1 to 3 sulfo groups, and $X_1$ is chlorine $D_2$ has the same definition as $D_1$ or is a radical of formula

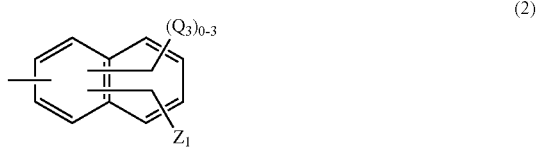

wherein
$(Q_3)_{0-3}$ denotes from 0 to 3 identical or different substituents selected from the group halogen, $C_1$-$C_4$ alkyl, $C_1$-$C_4$ alkoxy, carboxy and sulfo and
$Z_1$ is a radical of formula —SO$_2$—Y (3a), —NH—CO—(CH$_2$)$_m$—SO$_2$—Y (3b), —CONH—(CH$_2$)$_n$—SO$_2$—Y (3c), —NH—CO—CH(Hal)-CH$_2$-Hal (3d) or —NH—CO—C(Hal)=CH$_2$ (3e), Y is vinyl or a —CH$_2$—CH$_2$—U radical and U is a group that is removable under alkaline conditions,
m and n are each independently of the other the number 2, 3 or 4, and Hal is halogen, with the proviso that the dye of formula (1) does not contain a hydroxysulfonylmethyl group.

2. A reactive dye according to claim 1, wherein $Q_1$ and $Q_2$ are hydrogen.

3. A reactive dye according to claim 1, wherein
U is —Cl—Br, —F, —OSO$_3$H, —SSO$_3$H, —OCC—CH$_3$, —OPO$_3$H$_2$, —OCO—C$_6$H$_5$, —OSO$_2$—C$_1$-C$_4$ alkyl or —OSO$_2$—N(C$_1$-C$_4$ alkyl)$_2$.

4. A reactive dye according to claim 1 wherein $D_2$ is a radical of formula

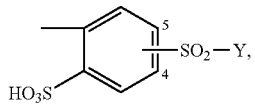

(2aa)

wherein
Y is vinyl or β-sulfatoethyl.

5. A process for the preparation of a dye of formula (1) according to claim 1, which comprises
(i) diazotisation of approximately one molar equivalent of an amine of formula

D$_2$-NH$_2$ (13)

and reaction with approximately one molar equivalent of a compound of formula

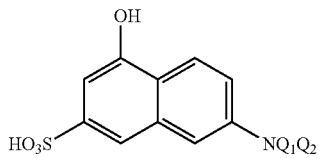

(14)

to form a compound of formula

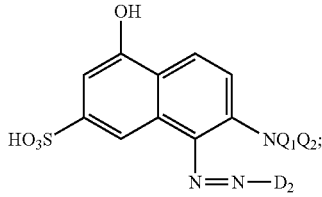

(15a)

and
(ii) diazotisation of approximately one molar equivalent of an amine of formula

D$_1$-NH$_2$ (16)

and reaction with approximately one molar equivalent of the compound of formula (15a) obtained according to (i) to form a compound of formula (1) according to claim 1 wherein $D_1$, $D_2$, $Q_1$ and $Q_2$ each have the definitions given in claim 1.

6. An aqueous ink that comprises a reactive dye of formula (1) according to claim 1.

7. A process for printing a substrate comprising spraying individual droplets of an aqueous ink onto the substrate from a nozzle in a controlled manner wherein the aqueous ink comprises a reactive dye of formula

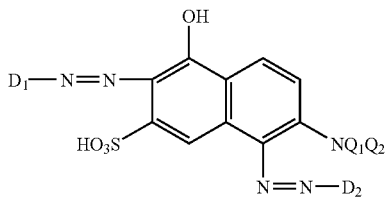

(1)

wherein
$Q_1$ and $Q_2$ are each independently of the other hydrogen or unsubstituted or substituted $C_1$-$C_4$alkyl,
$D_1$ corresponds to a radical of formula (5) or (11)

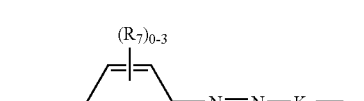

(5)

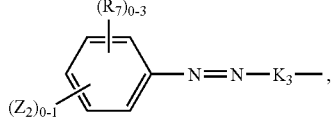

(11)

wherein
$R_5$ is hydrogen or $C_1$-$C_4$ alkyl,
$(R_7)_{0-3}$ denotes from 0 to 3 identical or different substituents selected from the group halogen, $C_{1-4}$alkyl, $C_1$-$C_4$ alkoxy, $C_2$-$C_4$ alkanoylamino, carboxy and sulfo,
$X_4$ is fluorine or chlorine, $Z_2$ is a fibre-reactive radical of formula $$-SO_2-Y \qquad (3a),$$

wherein $Y$ is vinyl or β-sulfatoethyl, $T_3$ is a radical of formula

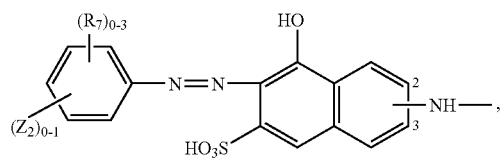
(8a)

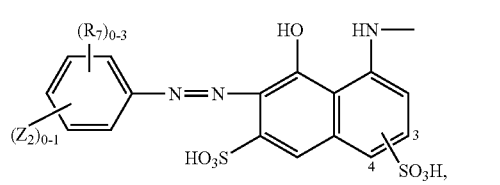
(8b)

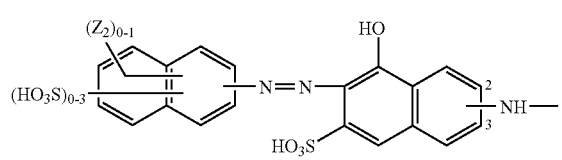
(8d)

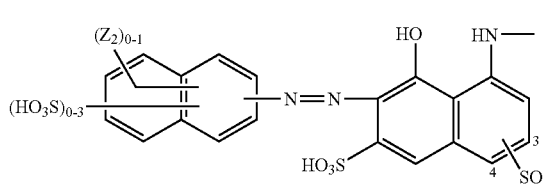
(8e)

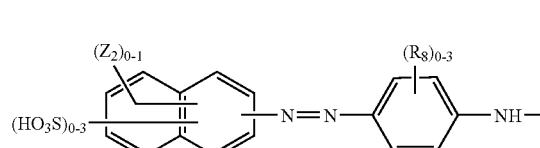
(8f)

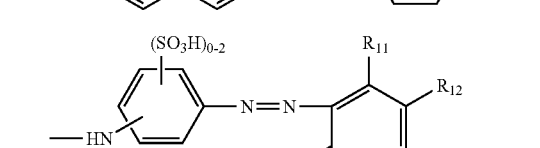
(8k)

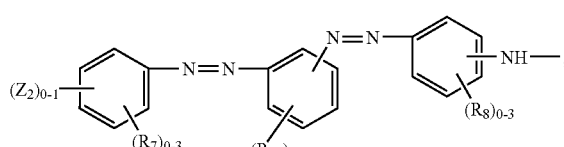
(8m)

wherein $(R_7)_{0-3}$ is as defined hereinabove, $(R_8)_{0-3}$ denotes from 0 to 3 identical or different substituents from the group halogen, nitro, cyano, trifluoromethyl, sulfamoyl, carbamoyl, $C_1$-$C_4$ alkyl, $C_1$-$C_4$ alkoxy unsubstituted or substituted by hydroxy, sulfato or by $C_1$-$C_4$ alkoxy, amino, $C_2$-$C_4$ alkanoylamino, ureido, hydroxy, carboxy, sulfomethyl, $C_1$-$C_4$ alkylsulfonylamino and sulfo, $R_{11}$ and $R_{13}$ are each independently of the other hydrogen, $C_1$-$C_4$ alkyl or phenyl, $R_{12}$ is hydrogen, cyano, carbamoyl or sulfomethyl, $(R_{14})_{0-3}$ denotes from 0 to 3 identical or different substituents from the group $C_1$-$C_4$ alkyl, $C_1$-$C_4$ alkoxy, halogen, carboxy and sulfo, and $Z_2$ is as defined hereinabove, $K_3$ is the radical of a coupling component of formula

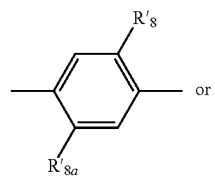
(12a)

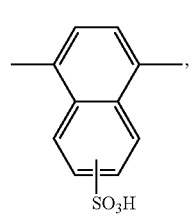
(12b)

wherein $R'_8$ is hydrogen, sulfo, or $C_1$-$C_4$ alkoxy unsubstituted or substituted in the alkyl moiety by hydroxy or by sulfato, and $R'_{8a}$ is hydrogen, $C_1$-$C_4$ alkyl, $C_1$-$C_4$ alkoxy, $C_2$-$C_4$ alkanoylamino, ureido or a radical of formula

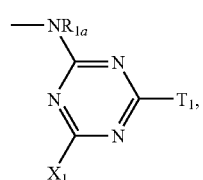
(3f)

wherein $R_{1a}$ is hydrogen, $T_1$ is amino; N-mono- or N,N-di-$C_1$-$C_4$ alkylamino unsubstituted or substituted in the alkyl moiety/moieties by hydroxy, sulfato or by sulfo; morpholino; phenylamino unsubstituted or substituted on the phenyl ring by sulfo, carboxy, acetylamino, chlorine, methyl or by methoxy; or N—$C_1$-$C_4$ alkyl-N-phenylamino unsubstituted or substituted in the same way on the phenyl ring and in which the alkyl is unsubstituted or substituted by hydroxy, sulfo or by sulfato; or naphthylamino unsubstituted or substituted by from 1 to 3 sulfo groups, and $X_1$ is chlorine $D_2$ has the same definition as $D_1$ or is a radical of formula

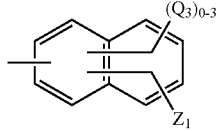
(2)

wherein $(Q_3)_{0-3}$ denotes from 0 to 3 identical or different substituents selected from the group halogen, $C_1$-$C_4$alkyl, $C_1$-$C_4$alkoxy, carboxy and sulfo and $Z_1$ is a radical of formula —$SO_2$—Y (3a), —NH—CO—$(CH_2)_m$—$SO_2$—Y (3b), —CONH—$(CH_2)_n$—$SO_2$—Y (3c), —NH—CO—CH(Hal)-$CH_2$-Hal (3d) or —NH—CO—C(Hal)=$CH_2$ (3e), Y is vinyl or a —$CH_2$—$CH_2$—U radical and U is a group that is removable under alkaline conditions, m and n are each independently of the other the number 2, 3 or 4, and Hal is halogen with the proviso that the dye of formula (1) does not contain a hydroxysulfonylmethyl group.

8. The process of claim 7 wherein the substrate is selected from textile fibre material, paper and plastic film.

9. A method for dyeing fibre material which comprises applying a reactive dye of formula (1) according to claim 1 to the fibre material and fixing the reactive dye to the fibre material.

10. The method according to claim 9 wherein the fibre material is a hydroxyl-group-containing fibre material or a nitrogen-group-containing fibre material.

11. The method of claim 9 wherein the fibre material is a cellulosic fibre material.

12. The method of claim 11 wherein the cellulosic fibre material is a cotton-containing fibre material.

* * * * *

UNITED STATES PATENT AND TRADEMARK OFFICE
CERTIFICATE OF CORRECTION

| | | |
|---|---|---|
| PATENT NO. | : 7,572,301 B2 | Page 1 of 1 |
| APPLICATION NO. | : 10/592976 | |
| DATED | : August 11, 2009 | |
| INVENTOR(S) | : Athanassios Tzikas, Georg Roentgen and Hubert Jean Luc Christnacher | |

It is certified that error appears in the above-identified patent and that said Letters Patent is hereby corrected as shown below:

Title Page, item (57): In the Abstract and in column 1, lines 53-58, column 50, lines 60-65 and column 55, lines 3-8, the radical of formula (2) appearing as " 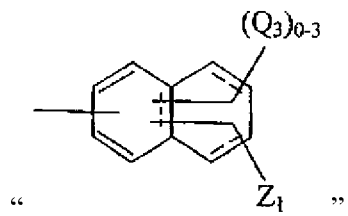 "

in each occurrence should appear as

-- 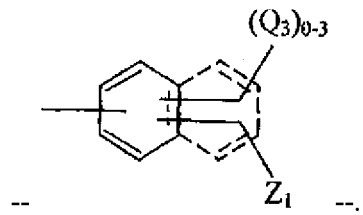 --.

Signed and Sealed this
Seventh Day of February, 2012

David J. Kappos
*Director of the United States Patent and Trademark Office*